United States Patent
Watanabe

(12) 
(10) Patent No.: US 6,522,356 B1
(45) Date of Patent: *Feb. 18, 2003

(54) COLOR SOLID-STATE IMAGING APPARATUS

(75) Inventor: Takashi Watanabe, Soraku-gun (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,364

(22) Filed: Aug. 13, 1997

(30) Foreign Application Priority Data

Aug. 14, 1996 (JP) .............................. 8-214802

(51) Int. Cl.$^7$ .......................... H04N 3/14; H04N 5/335; H04N 9/04
(52) U.S. Cl. ....................................... 348/272; 348/275
(58) Field of Search ................................. 348/266, 272, 348/273, 274, 275, 277, 279, 280, 283

(56) References Cited

U.S. PATENT DOCUMENTS

| | | | | |
|---|---|---|---|---|
| 3,971,065 A | | 7/1976 | Bayer .......................... | 358/41 |
| 4,565,756 A | * | 1/1986 | Needs et al. ................. | 348/273 |
| 4,602,289 A | * | 7/1986 | Sekine ........................ | 348/315 |
| 4,791,307 A | * | 12/1988 | Kawajiri et al. ............. | 348/280 |
| 5,018,006 A | * | 5/1991 | Hashimoto ................... | 348/275 |
| 5,099,317 A | * | 3/1992 | Takemura ..................... | 348/264 |
| 5,155,584 A | * | 10/1992 | Taguchi et al. .............. | 348/231 |
| 5,319,451 A | * | 6/1994 | Sasaki et al. ................ | 348/273 |
| 5,519,668 A | * | 5/1996 | Montaron ..................... | 367/35 |
| 5,737,017 A | * | 4/1998 | Udagawa et al. ............ | 348/280 |
| 5,805,217 A | * | 9/1998 | Lu et al. ..................... | 348/273 |
| 5,847,758 A | * | 12/1998 | Iizuka ........................ | 348/273 |

FOREIGN PATENT DOCUMENTS

JP 63-141485 6/1988
JP 02-268085 11/1990

OTHER PUBLICATIONS

Nishida et al.; Wide Dynamic Range HDTV Image Seneor with Aliasing Suppression; IEEE Transactions on Consumer Electronics; vol. 34, No. 3; pp. 506–512 Aug. 1988.*
T. Soga et al., Digital Card Camera, ITE Technical Report, vol. 17 No 16, pp. 45–50, Mar. 1993.
S. Nakagawa et al., A 1/3–Inch 330K–Pixel Progressive–Scan CCD Image Sensor, ITE Technical Report, vol. 19 No. 45, pp. 1–6, Sep. 1995.
J. Hynecek, BCMD–An Improved Photosite Structure For High–Density Image Sensors, IEEE Transactions on Electron Devices, vol. 38 No. 5, pp. 1011–1020, May 1991.
An Office Action, dated Mar. 7, 2002, corresponding to Japanese Patent Application No. 8–214802 (Japanese language only no translation).

* cited by examiner

*Primary Examiner*—Aung S. Moe
(74) *Attorney, Agent, or Firm*—Dike, Bronstein, Roberts & Cushman; David G. Conlin; David A. Tucker

(57) ABSTRACT

A color solid-state imaging apparatus of the present invention, includes a plurality of pixels conducting photoelectric conversion arranged in a matrix and color filters disposed so as to correspond to the plurality of pixels, wherein the color filters include first filters of a first kind, second filters of a second kind, and third filters of a third kind having spectral characteristics different from each other, the plurality of pixels are arranged at a pitch L in a first direction to form rows, and each of the rows is arranged at a pitch M/2 in a second direction orthogonal to the first direction, the pixels disposed in even-number rows are shifted in the first direction by L/2 from the corresponding pixels disposed in odd-number rows, the first filters are disposed so as to correspond to all the pixels arranged in the odd-number rows, the second filters are disposed so as to correspond to a half of the pixels arranged in the even-number rows at a predetermined period, and the third filters are disposed so as to correspond to the remaining pixels in the even-number rows.

11 Claims, 18 Drawing Sheets

PRIOR ART

PRIOR ART

*PRIOR ART*

COLOR SOLID-STATE IMAGING APPARATUS

BACKGROUND OF THE INVENTION

1. Field of the Invention

The present invention relates to a color solid-state imaging apparatus, and more particularly to a color solid-state imaging apparatus capable of providing high color resolution in progressive scan reading.

2. Description of the Related Art

In recent years, there has been an increasing demand for a two-dimensional solid-state imaging apparatus used in an image input device for a personal computer and an electronic still camera. Conventionally, a two-dimensional solid-state imaging apparatus has been developed mainly for a video camera. Such a two-dimensional solid-state imaging apparatus basically uses an interlace reading method in which every other pixel is read in a vertical scanning direction. However, unlike the case of being used in a video camera, etc., in the case of being used in a personal computer and a still camera, a two-dimensional solid-state imaging apparatus is required to use a progressive scan reading method in which all the pixels are sequentially read at a time. The progressive scan reading method has the advantage of providing higher vertical resolution of an image obtained by one reading, compared with the interlace reading method.

Various single chip coloring methods for performing a color display using one two-dimensional solid-state imaging apparatus in the progressive scan reading method have been proposed. Various color filter arrangements applicable to the various simple plate coloring methods have also been proposed. Particularly in the case of attaching importance to color reproducibility, it is desired to use primary colors for color filters.

FIG. 17A shows a color filter arrangement 500 including three primary colors of green (G), red (R), and blue (B) used in a two-dimensional solid-state imaging apparatus (progressive scan reading type charge coupled device (CCD)). The color filter arrangement 500 as shown in FIG. 17A is known as a Bayer arrangement, which is described, for example, in "A ⅓-inch 330 k-pixel Progressive Scan CCD Image Sensor" by Nakagawa et al., Technical Report of the Institute of Television Engineers, Sep. 22, 1995; "Color imaging array", B. E. Bayer, U.S. Pat. No. 3,971,065, etc.

As shown in FIG. 17A, in the color filter arrangement 500, twice as many pixels as those assigned to each of R and B are assigned to G, and G pixels are arranged in a checkered pattern. R and B pixels are arranged in an orthogonal lattice (i.e., lattice in horizontal and vertical directions) at a two-pixel period both in the horizontal and vertical directions. A luminance signal requires high resolution. Therefore, G pixels to which human eyes have high sensitivity are placed so as to occupy a half of all the pixels, whereby the resolution of a luminance signal can be increased.

FIG. 17B shows spatial resolution characteristics (i.e., resoluble regions in each direction in a two-dimensional space) of the respective G, R, and B pixels in the color filter arrangement 500. G pixels which largely occupy the luminance signal are arranged in a checkered pattern, whereby the luminance signal with relatively high resolution is obtained in the horizontal and vertical directions, as shown in FIG. 17B. However, sufficient resolution cannot be obtained in oblique directions.

FIG. 18A shows a color filter arrangement 510 including G, R, and B primary colors used in a two-dimensional solid-state imaging apparatus (CCD which operates in the same way as in a progressive scan reading type CCD). The color filter arrangement 510 as shown in FIG. 18A is described, for example, in "Digital card camera" by Soga et al., Technical Report of the Institute of Television Engineers, Mar. 4, 1993. In the same way as in the color filter arrangement 500 shown in FIG. 17A, twice as many pixels as those assigned to each of R and B are assigned to G which largely occupies the luminance signal in the color filter arrangement 510. However, the G pixels are arranged in a stripe pattern, unlike the color filter arrangement 500. In the color filter arrangement 510, R and B pixels are arranged on a diamond lattice (i.e., skew lattice) at a two-pixel period in the horizontal direction and at a one-pixel period in the vertical direction.

FIG. 18B shows spatial resolution characteristics of the respective G, R, and B pixels in the color filter arrangement 510. As shown in this figure, the resolution of the luminance signal is relatively high in the vertical and oblique directions; however, the resolution of the luminance signal is not sufficient in the horizontal direction.

The two-dimensional solid-state imaging apparatuses using the above-mentioned color filter arrangements 500 and 510 are of a progressive scan reading type or an equivalent type thereof, and the pixels are arranged in the horizontal and vertical lattice. Therefore, there is a limit to spatial resolution characteristics in any color filter arrangement.

In the case of using an X-Y scan reading type apparatus as a two-dimensional solid-state imaging apparatus in place of a CCD, the degree of freedom of the pixel arrangement becomes larger. For example, FIG. 19A shows a color filter arrangement 520 of an amplifier-type two-dimensional solid-state imaging apparatus of a progressive scan reading type using an X-Y scan reading method. The color filter arrangement 520 as shown in this figure is described, for example, in "BCMD—An Improved Photosite Structure for High-Density Image Sensors" by J. Hynecek, IEEE Trans. on Electron Devices, Vol. 38, No. 5, May, 1991.

As shown in FIG. 19A, assuming that an arrangement in a horizontal line represents a "row", the odd-number row (as counted from the topmost row) and the even-number row (as counted from the topmost row) in the vertical direction are shifted from each other by a 1/2 pixel pitch in the horizontal direction in the color filter arrangement 520. The respective G, R, and B pixels are arranged in each row in the order of R-G-B at a three-pixel period. Furthermore, the respective G, R, and B pixels are arranged in such a manner that identical color pixels are shifted by a 3/2 pixel pitch in the odd-number row and the even-number row. Thus, as shown in FIG. 19B, the spatial resolution characteristics of each color pixel match with each other. Relatively balanced resolution is obtained in the G, R, and B pixels. However, the horizontal resolution is not sufficient.

In the case where a color image obtained in a two-dimensional solid-state imaging apparatus is taken in a personal computer, luminance signal pixels or G pixels are desirably placed in a square lattice (i.e., an orthogonal lattice in which a horizontal pitch is equal to a vertical pitch). However, the color filter arrangements 510 and 520 shown in FIGS. 18A and 19A cannot satisfy this requirement. If a horizontal pixel pitch L is prescribed to be ½ of a vertical pixel pitch M (i.e., L=M/2) in the color filter arrangement 510 shown in FIG. 18A, the above-mentioned requirement can be satisfied. However, when the horizontal pixel pitch L is substantially decreased, the performance of the two-dimensional solid-state imaging apparatus becomes likely to degrade. For example, in the case of a CCD type two-dimensional solid-state imaging apparatus, the amount of transferable signal charge is decreased, making it difficult to maintain a dynamic range.

In the case of an X-Y scan reading type solid-state imaging apparatus, the performance is more easily maintained as the pixel configuration becomes closer to a square or a circle as in the color filter arrangement 520 shown in FIG. 19A.

SUMMARY OF THE INVENTION

The color solid-state imaging apparatus of this invention includes: a plurality of pixels conducting photoelectric conversion arranged in a matrix and color filters disposed so as to correspond to the plurality of pixels, wherein the color filters include first filters of a first kind, second filters of a second kind, and third filters of a third kind, each kind of filter having spectral characteristics different from the others, the plurality of pixels are arranged at a pitch L in a first direction to form rows, and each of the rows is arranged at a pitch M/2 in a second direction orthogonal to the first direction, the pixels disposed in even-number rows are shifted in the first direction by L/2 from the corresponding pixels disposed in odd-number rows, the first filters are disposed so as to correspond to all the pixels arranged in the odd-number rows, the second filters are disposed so as to correspond to a half of the pixels arranged in the even-number rows at a predetermined period, and the third filters are disposed so as to correspond to the remaining pixels in the even-number rows.

In one embodiment of the invention, L=M.

In another embodiment of the invention, the second filters are disposed so as to correspond to every other pixel in each of the even-number rows.

In another embodiment of the invention, the second filters are disposed at every other pixel in each of the even-number rows, and in an even-number row next to one even-number row with one odd-number row interposed therebetween, the second filters are disposed with respect to the remaining pixels not corresponding to the pixels at which the second filters are disposed in the one even-number row.

In still another embodiment of the invention, the second filters are disposed at every other pixel in each of the even-number rows, and in an even-number row next to one even-number row with one odd-number row interposed therebetween, the second filters are disposed with respect to the remaining pixels corresponding to the pixels at which the second filters are disposed in the one even-number row.

In still another embodiment of the invention, the second filters and the third filters are alternately disposed on a row basis in every other even-number row.

In still another embodiment of the invention, the first filters are green filters, the second filters are red filters, and the third filters are blue filters.

In still another embodiment of the invention, the plurality of pixels disposed in a matrix are scanned in the first and second directions, whereby video signals are read from the plurality of pixels.

In still another embodiment of the invention, the apparatus comprises: a first scanning circuit for scanning the plurality of pixels in the first direction and a second scanning circuit for scanning the plurality of pixels in the second direction.

In still another embodiment of the invention, the first and second scanning circuits sequentially scan all the plurality of pixels disposed in a matrix in the first and second directions.

In still another embodiment of the invention, the apparatus comprises: a plurality of vertical signal lines for transmitting a video signal read from each of the pixels by scanning of the second scanning circuit and a plurality of memory devices provided with respect to each of the vertical signal lines, for holding the video signals on the vertical signal lines, wherein the first scanning circuit scans the plurality of memory devices to read an identical video signal of one pixel held by the memory device at least twice, thereby substantially increasing resolution in the second direction.

In still another embodiment of the invention, the plurality of memory devices include a first memory device group provided with respect to the pixels in the odd-number rows and a second memory device group provided with respect to the pixels in the even-number rows, a plurality of horizontal signal lines for transmitting video signals read from the first and second memory device groups are provided, the first scanning circuit reads an identical video signal of one pixel held by each of the memory devices of the first and second memory device groups at least twice at a predetermined period, and a timing at which a video signal output from one of the plurality of horizontal signal lines changes from a video signal in one horizontal row to a video signal in a subsequent horizontal row is different from a timing at which a video signal output from another horizontal signal line different from the one of the plurality of horizontal signal lines changes from a video signal in one horizontal row to a video signal in a subsequent horizontal row.

Hereinafter, the function of the present invention will be described.

In the above-mentioned color filter arrangement, the G pixels (first color filters) which largely occupy a luminance signal are placed in a lattice with a predetermined interval in the first and second directions. Assuming that the first direction is a horizontal direction and the second direction is a vertical direction, high resolution can be obtained in the horizontal, vertical, and oblique directions. Furthermore, the R and B pixels (second and third color filters) can respectively provide spacial resolution which is ½ of that of the G pixels. Therefore, well-balanced color resolution can be obtained. Furthermore, in the case of L=M, the G pixels are placed in a square lattice and luminance signals in a square pixel arrangement can be obtained, so that an arrangement suitable for taking in a color image into a personal computer can be obtained.

Thus, the invention described herein makes possible the advantage of providing a novel color solid-state imaging apparatus of a progressive scan reading type which is capable of obtaining high color reproducibility and high spatial resolution by using a single plate coloring method.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative examples with reference to the drawings.

Figure 1A:
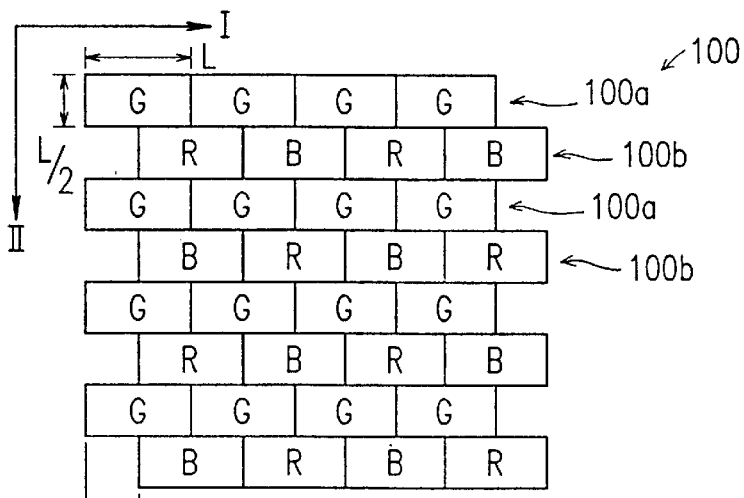
FIGS. 1A through 1C show exemplary color filter arrangements used in a two-dimensional solid-state imaging apparatus according to the present invention, where the pitch of G pixels in the first direction is equal to that in the second direction.
Figure 1B:
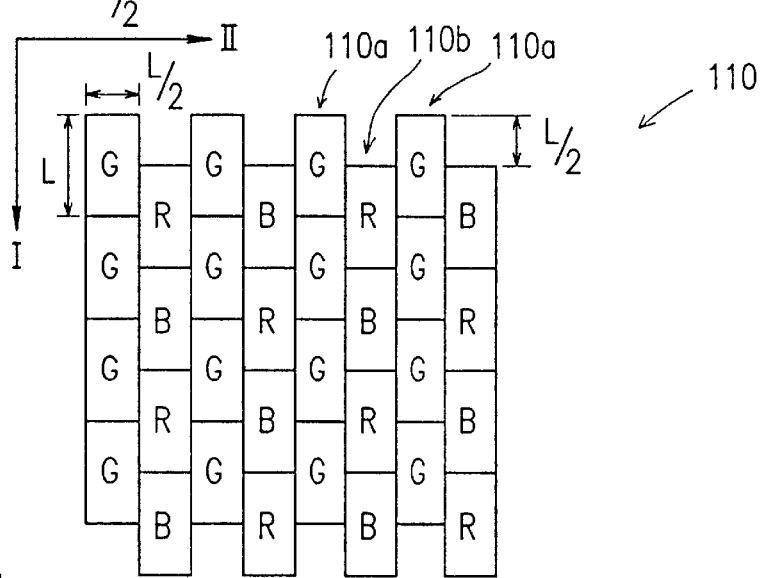
Figure 1C:
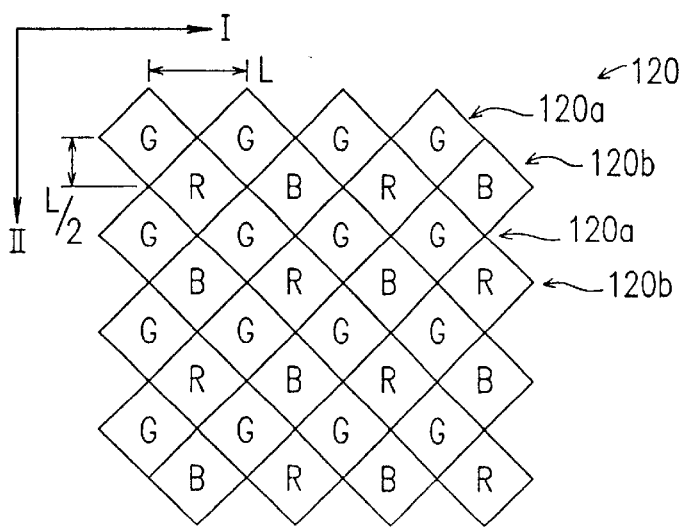

FIGS. 1A, 1B, and 1C show color filter arrangements 100, 110, and 120 used in a two-dimensional solid-state imaging apparatus according to the present invention. In these figures, I represents a first direction; II represents a second direction; and L represents a predetermined size, corresponding to a pixel pitch in the first direction. Assuming that a pixel arrangement placed in the first direction is a row, only G pixels are arranged in odd-number rows (2n–1: denoted by 100a, 110a, and 120a, where n is a natural number) and R pixels and B pixels are alternately arranged in each even-number row (2n: denoted by 100b, 110b, and 120b, where n is a natural number) in any of the color filter arrangements 100, 110, and 120.

As shown in FIGS. 1A, 1B, and 1C, in any of the color filter arrangements 100, 110, and 120, the arrangement of the R pixels and the B pixels in the $2n^{th}$ row is reversed to that in the $2(n+1)^{th}$ row in the respective even-number rows. Furthermore, the pixel pitch in the first direction is L, and that in the second direction is L/2. In FIGS. 1A and 1C, the first direction corresponds to a horizontal direction, and the second direction corresponds to a vertical direction. In FIG. 1B, the first direction corresponds to a vertical direction, and the second direction corresponds to a horizontal direction. However, the spacial arrangement of each color is identical in any of the color filter arrangements 100, 110, and 120.

In particular, G pixels are in a square arrangement with a pitch of L both in the horizontal and vertical directions in any of the color filter arrangements 100, 110, and 120. Accordingly, a square lattice arrangement can be realized with respect to a luminance signal, which is useful for image input and the like into a personal computer.

Figure 2:
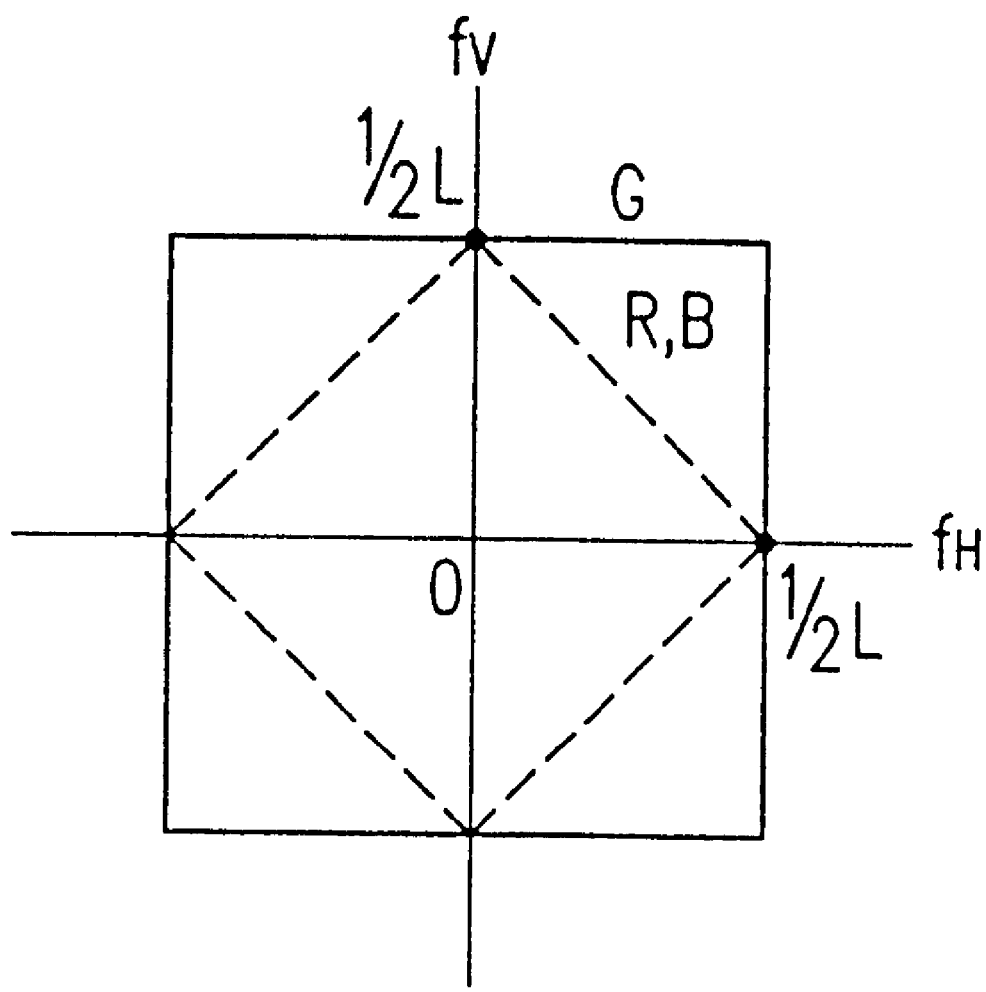
FIG. 2 shows spatial resolution characteristics in the color filter arrangements shown in FIGS. 1A through 1C.

The color filter arrangements 100, 110, and 120 have an identical spacial arrangement of each color, so that the resolution as shown in FIG. 2 can be obtained in any of these arrangements. More specifically, the color filter arrangements 100, 110, and 120 have the similar spacial resolution characteristics. In FIG. 2, $f_H$ represents a spacial frequency in the horizontal direction, and $f_V$ represents a spacial frequency in the vertical direction. It is understood from FIG. 2 that the G pixels are capable of having a resolution up to 1/(2L) in the horizontal and vertical directions and a resolution up to √2/(2L) in the diagonal direction of 45°. Although the R and B pixels have a resolution which is ½ of that of the G pixels in the entire space, they have a high resolution up to 1/(2L) in the horizontal and vertical directions. More specifically, well-balanced high resolution can be obtained both in the luminance signal and the chrominance signal.

Figure 3A:
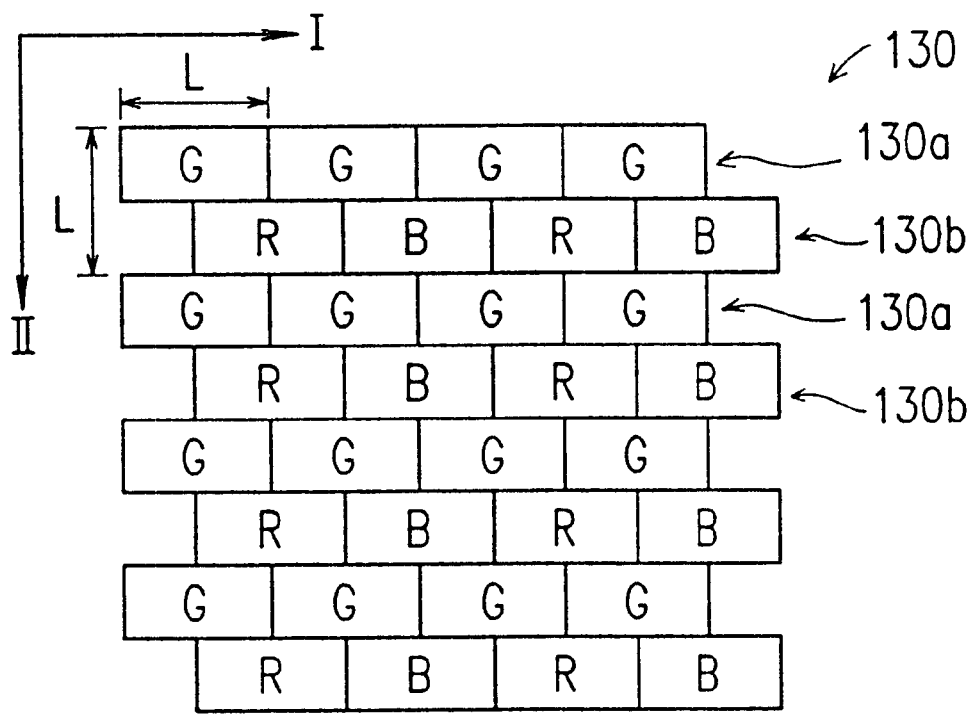
FIG. 3A shows an exemplary color filter arrangement used in the two-dimensional solid-state imaging apparatus according to the present invention.

FIG. 3A shows a color filter arrangement 130 in which only the arrangements of the R and B pixels in the color filter arrangement 100 shown in FIG. 1A are modified. In the color filter arrangement 130, only the G pixels are arranged in the odd-number rows (2n–1: denoted by 130a, where n is a natural number) and the R and B pixels are alternately arranged in each even-number row (2n: denoted by 130b, where n is a natural number) in the color filter arrangement 130. The R and B pixels are arranged in the same way in the respective even-number rows. The pixel pitch in the first direction is L, and the pixel pitch in the second direction is L/2.

Figure 3B:
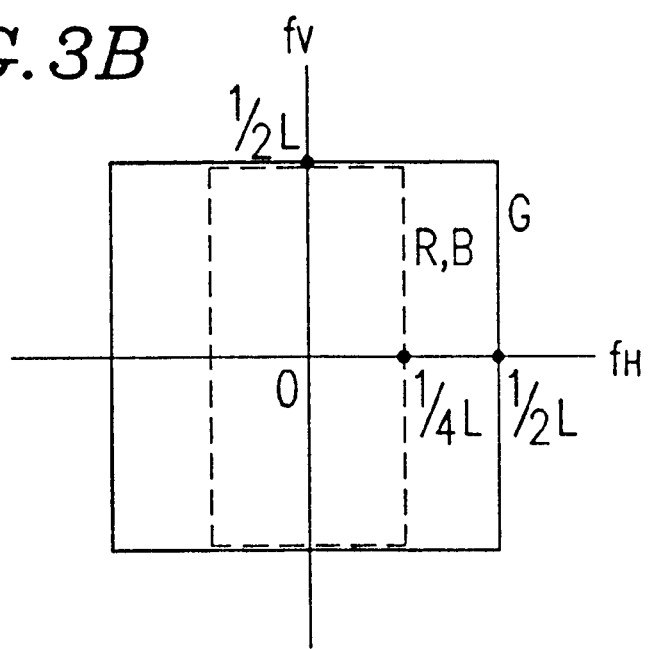
FIG. 3B shows spatial resolution characteristics in the color filter arrangement shown in FIG. 3A.

As shown in FIG. 3B, the spacial resolution of the R and B pixels are high in the vertical direction and low in the horizontal direction in the color filter arrangement 130.

Figure 4A:
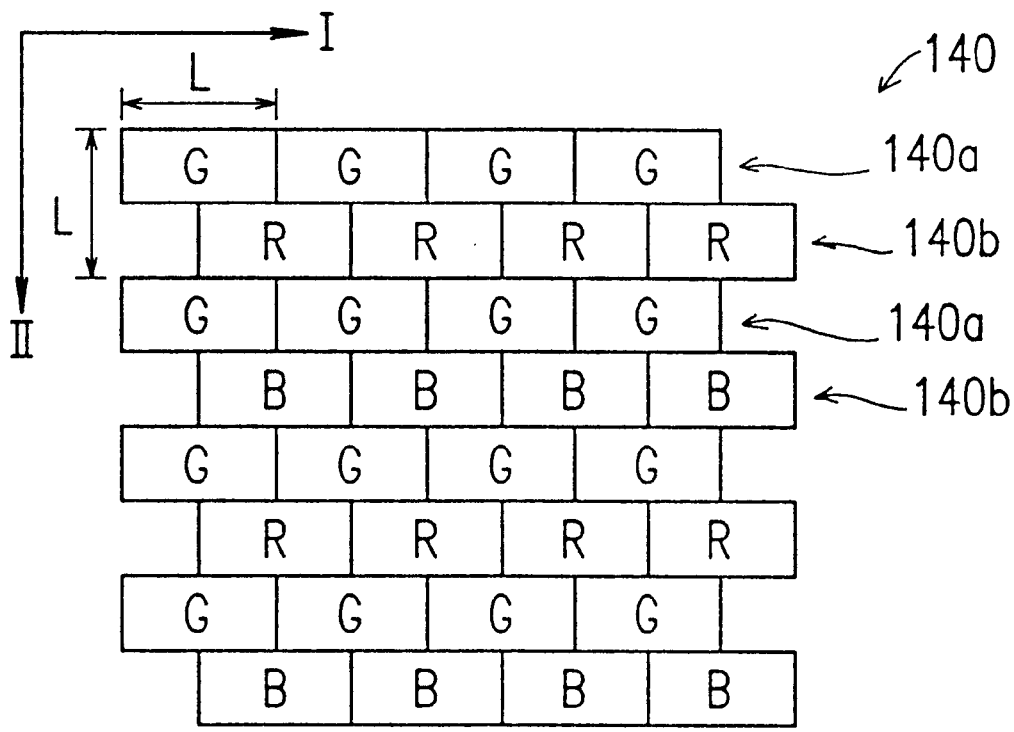
FIG. 4A shows another exemplary color filter arrangement used in the two-dimensional solid-state imaging apparatus according to the present invention.

FIG. 4A shows another color filter arrangement 140 in which only the arrangements of the R and B pixels are modified in the color filter arrangement 100 shown in FIG.

1A. In the color filter arrangement 140, only the R pixels (n=2n'−1, where n' is a natural number) or only the B pixels (n=2n', where n' is a natural number) are arranged in the even-number rows (2n: denoted by 140b). The pixel pitch in the first direction is L, and the pixel pitch in the second direction is L/2.

Figure 4B:
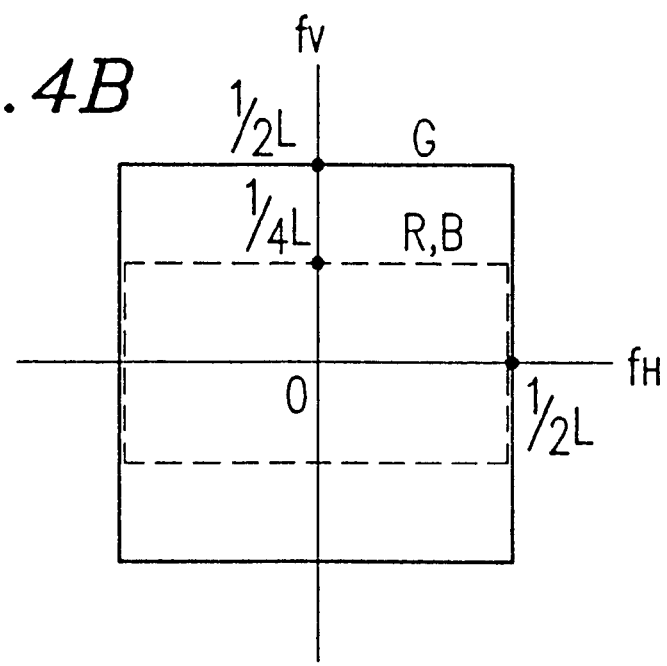
FIG. 4B shows spatial resolution characteristics in the color filter arrangement shown in FIG. 4A.

Thus, as shown in FIG. 4B, the spacial resolution of the R and B pixels is high in the horizontal direction and low in the vertical direction in the color filter arrangement 140.

Figure 5A:
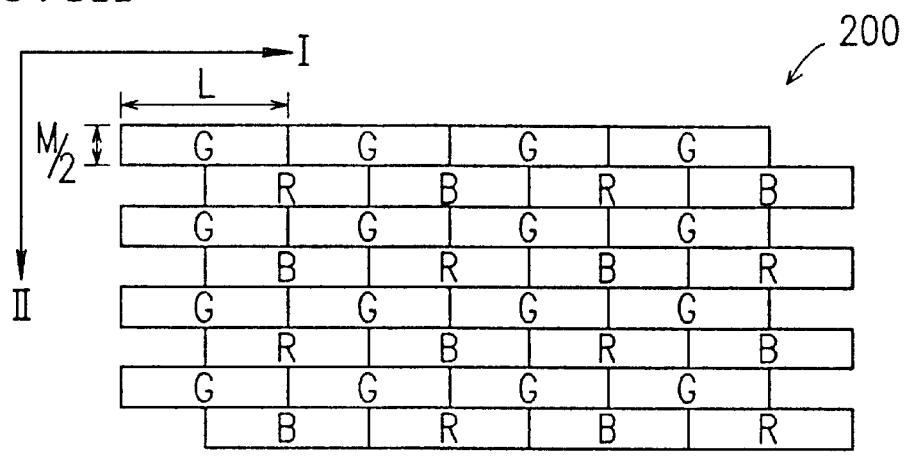
FIGS. 5A through 5C show still more exemplary color filter arrangements used in the two-dimensional solid-state imaging apparatus according to the present invention, where the pitch of G pixels in the first direction is different from that in the second direction.
Figure 5B:
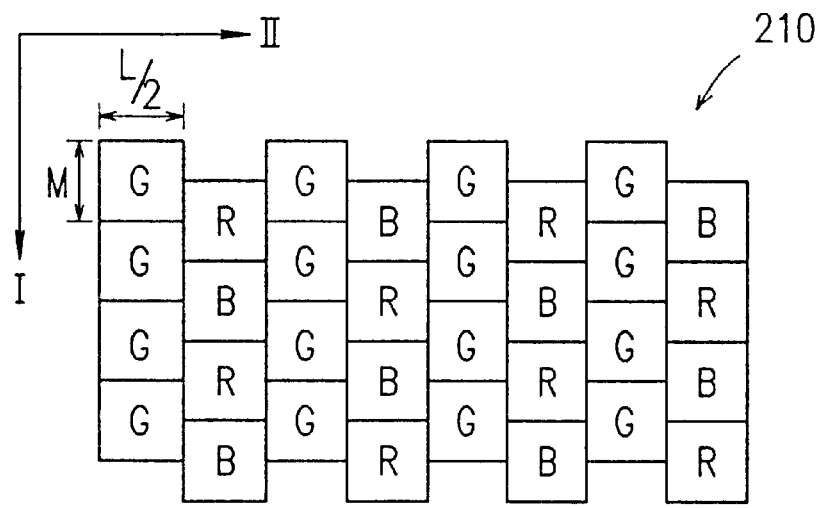
Figure 5C:
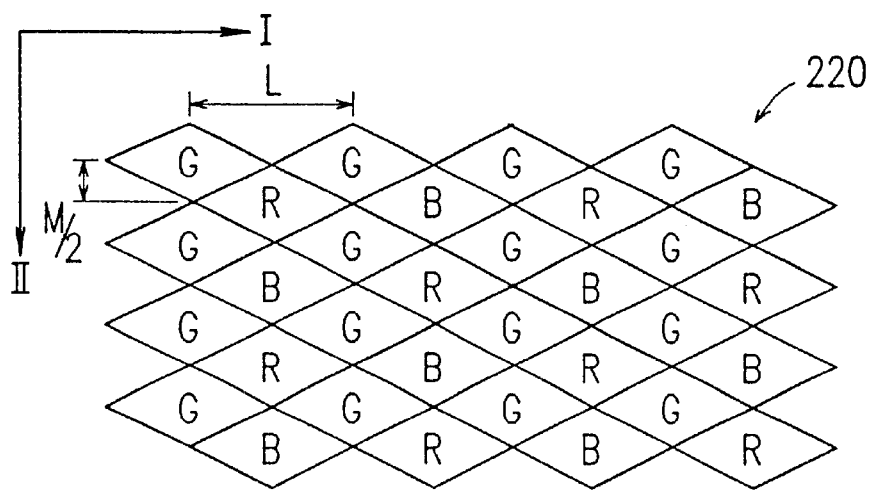

In the above-mentioned examples, the pitch of the G pixels in the horizontal direction is set to be equal to that in the vertical direction. Color filter arrangements 200, 210, and 220 shown in FIGS. 5A, 5B, and 5C show the cases where the pitches of the G pixels in the horizontal direction are not equal to those in the vertical direction in the color filter arrangements 100, 110, and 120 shown in FIGS. 1A, 1B, and 1C. More specifically, in the color filter arrangements 200 and 220 shown in FIGS. 5A and 5C, the pixel pitches in the first direction are L, and the pixel pitches in the second direction are M/2, where L>M. In the color filter arrangement 210 shown in FIG. 5B, the pixel pitch in the first direction is M, and the pixel pitch in the second direction is L/2, where L>M.

In FIGS. 5A and 5C, the first direction I corresponds to a horizontal direction, and the second direction II corresponds to a vertical direction. In FIG. 5B, the first direction I corresponds to a vertical direction, and the second direction II corresponds to a horizontal direction. However, the spacial arrangement of each color is identical in any of the color filter arrangements 200, 210, and 220. The G pixels are in a non-square arrangement having a pitch of L in the horizontal direction and a pitch of M in the vertical direction (L>M) in any of the color filter arrangements 200, 210, and 220.

Figure 6:
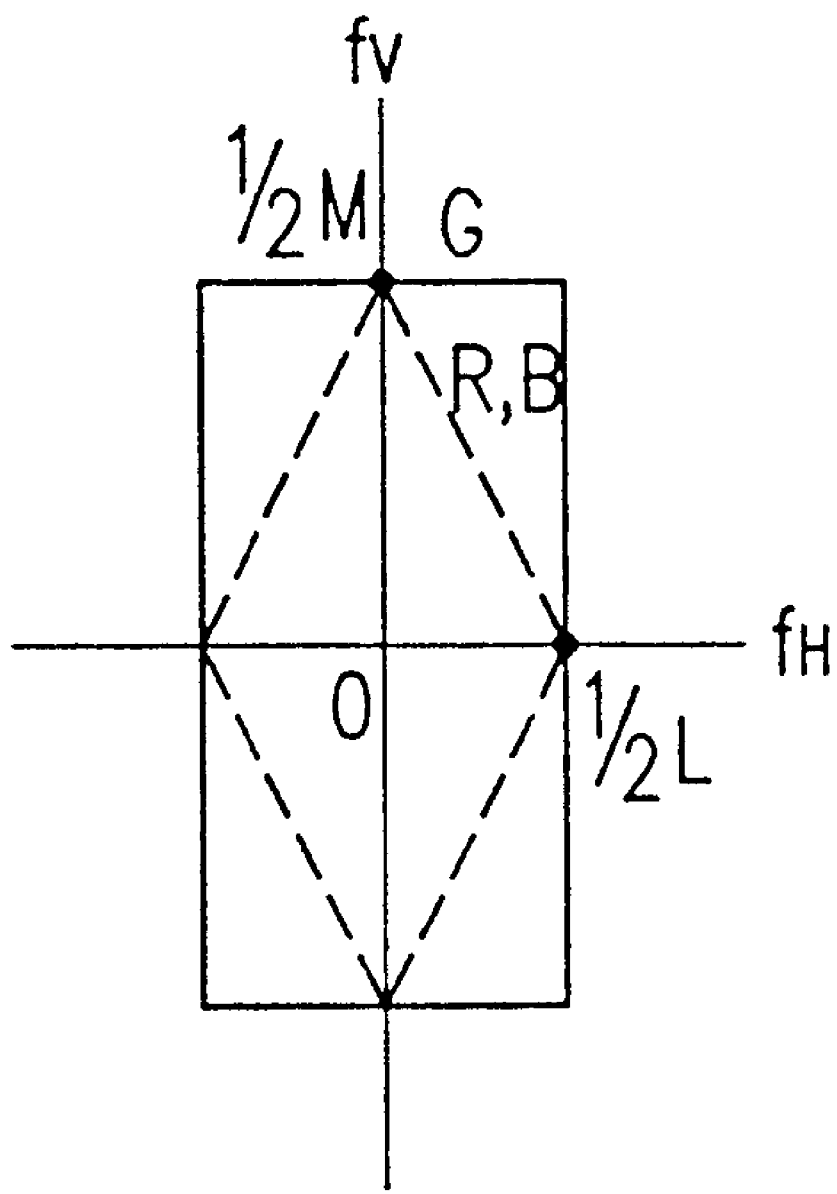
FIG. 6 shows spatial resolution characteristics in the color filter arrangements shown in FIGS. 5A through 5C.

FIG. 6 shows spacial resolution of each color in the color filter arrangements 200, 210, and 220. As shown in FIG. 6, in any of the color filter arrangements 200, 210, and 220, the G pixels have a resolution up to 1/(2L) in the horizontal direction and a resolution up to 1/(2M) in the vertical direction. Since L is larger than M, the resolution in the horizontal direction becomes lower than that in the vertical direction. The R and B pixels have a resolution which is ½ of that of the G pixels in the entire space. However, the R and B pixels have the same resolution as that of the G pixels in the horizontal and vertical directions.

In the case where a two-dimensional solid-state imaging apparatus is used in a personal computer and the like, the resolution in the horizontal direction is desirably equal to that in the vertical direction. To the contrary, this is not necessarily applied to the case where a two-dimensional solid-state imaging apparatus is used in a video camera and the like. The optimum resolution in the horizontal and vertical directions depend upon the configuration of an entire camera system. Thus, the color filter arrangements 200 through 220 shown in FIGS. 5A through 5C may be more advantageous. Alternatively, it may be more advantageous to prescribe the pixel pitches in the horizontal and vertical directions to be L<M in the color filter arrangements 200 to 220 in FIGS. 5A through 5C so that the resolution in the horizontal direction becomes higher than that in the vertical direction.

In the two-dimensional solid-state imaging apparatus according to the present invention, the pixel arrangements are shifted by ½ pixel in the first direction I between the odd-number row (2n−1) and the even-number row (2n). Such a pixel arrangement is more likely to be realized in an X-Y address type solid-state imaging apparatus than in an ordinary CCD-type imaging apparatus.

EXAMPLE 1

Figure 7:
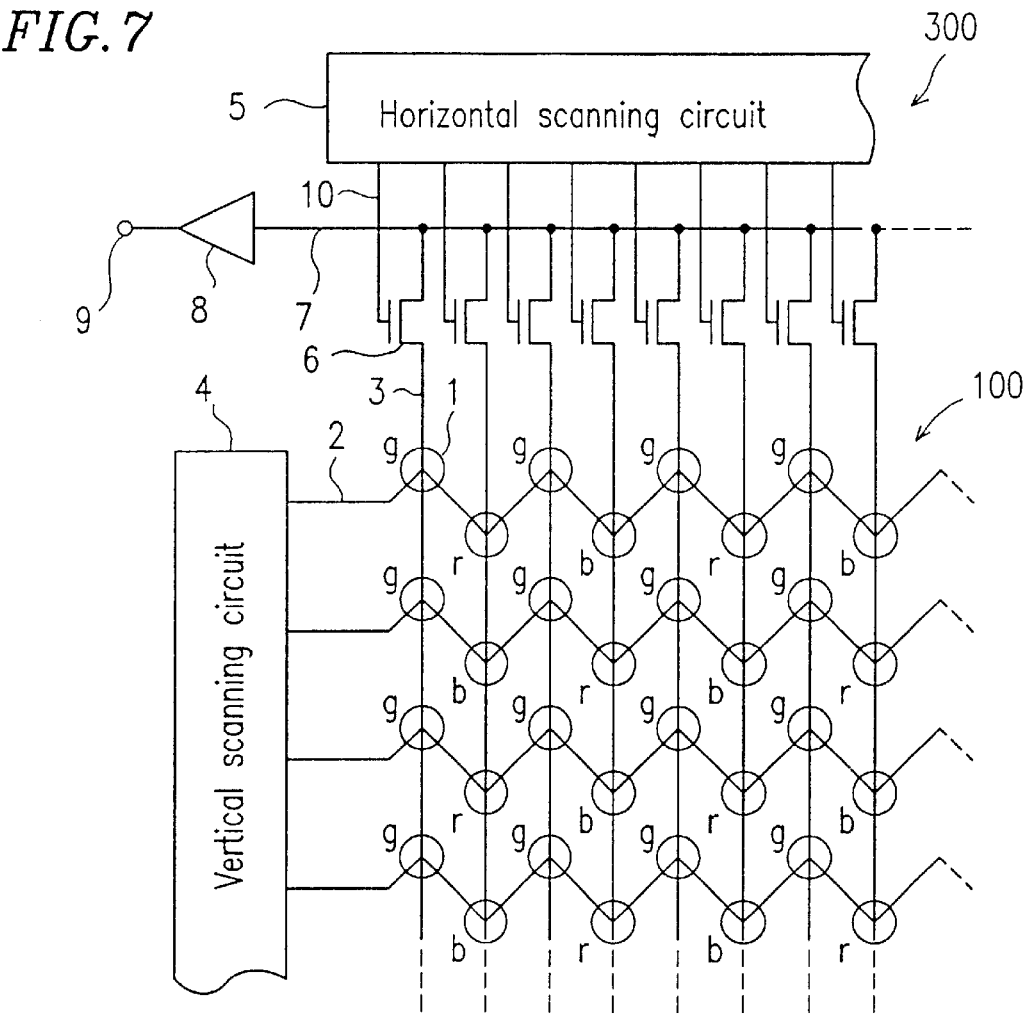
FIG. 7 schematically shows an exemplary circuit configuration of the two-dimensional solid-state imaging apparatus according to the present invention.

FIG. 7 shows an X-Y address type imaging apparatus 300 using the color filter arrangement 100 shown in FIG. 1A. As shown in FIG. 7, the imaging apparatus 300 includes a plurality of pixels 1, vertical drive lines 2, video signal lines 3, a vertical scanning circuit 4, a horizontal scanning circuit 5, selection switches 6, a horizontal signal line 7, an amplifier circuit 8, an output line 9, and drive signal lines 10.

Each pixel 1 is denoted by g, r, and b corresponding to G, R, and B of the color filter arrangement 100. The vertical scanning circuit 4 applies a drive signal to the vertical drive lines 2, whereby the corresponding pixels are sequentially driven in the vertical direction through the vertical drive lines 2. A video signal of each pixel connected to the vertical drive line 2 to which the drive signal is applied is read onto the corresponding video signal line 3. Each video signal line 3 is connected to the corresponding selection switch 6. The selection switch 6 is driven by a horizontal drive signal applied from the horizontal scanning circuit 5 through the drive signal line 10. Thus, each video signal line 3 is sequentially selected in the horizontal direction, and a video signal on the selected video signal line 3 is sequentially introduced into the horizontal signal line 7. The video signal on the horizontal signal line 7 is amplified by the amplifier circuit 8 and output through the output line 9.

Figure 8:
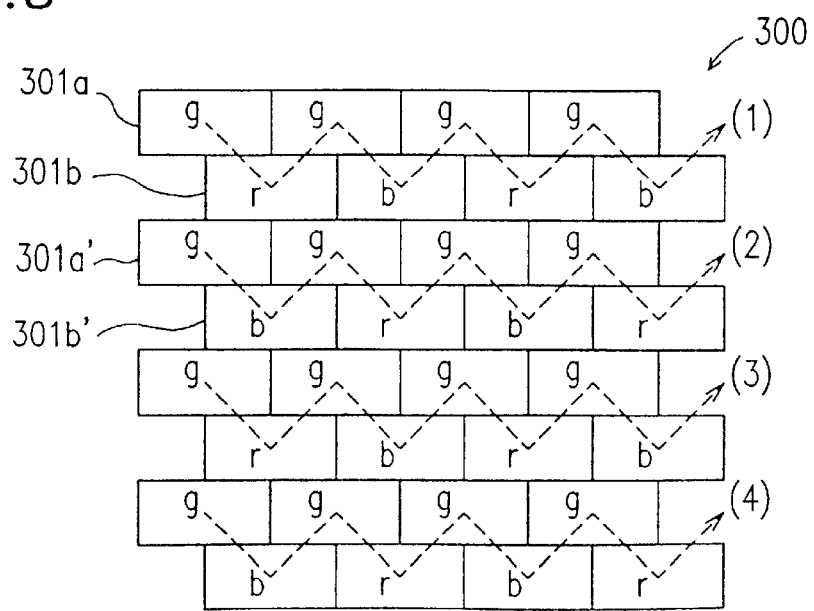
FIG. 8 schematically illustrates signal reading in the two-dimensional solid-state imaging apparatus shown in FIG. 7.

In the configuration of the imaging apparatus 300 shown in FIG. 7, two rows of pixel groups (g pixel group and rb pixel group) are driven by one vertical drive line 2, and the horizontal drive lines 3 are sequentially selected, whereby a video signal on each pixel is sequentially read in the horizontal direction. More specifically, referring to FIGS. 7 and 8, a video signal on each pixel is read at a time in a zigzag manner from two rows of pixel groups 301a and 301b connected to one vertical drive line 2 (see read group (1) in FIG. 8). Similarly, when a drive signal is applied to the next vertical drive line 2, a video signal on each pixel is read in a zigzag manner from two rows of pixel groups 301a' and 301b' connected to this vertical drive line 2 (see read group (2) in FIG. 8). Such a method for reading a video signal can be realized by contriving signal wiring in the case of an X-Y scan reading type imaging apparatus.

EXAMPLE 2

Figure 9:
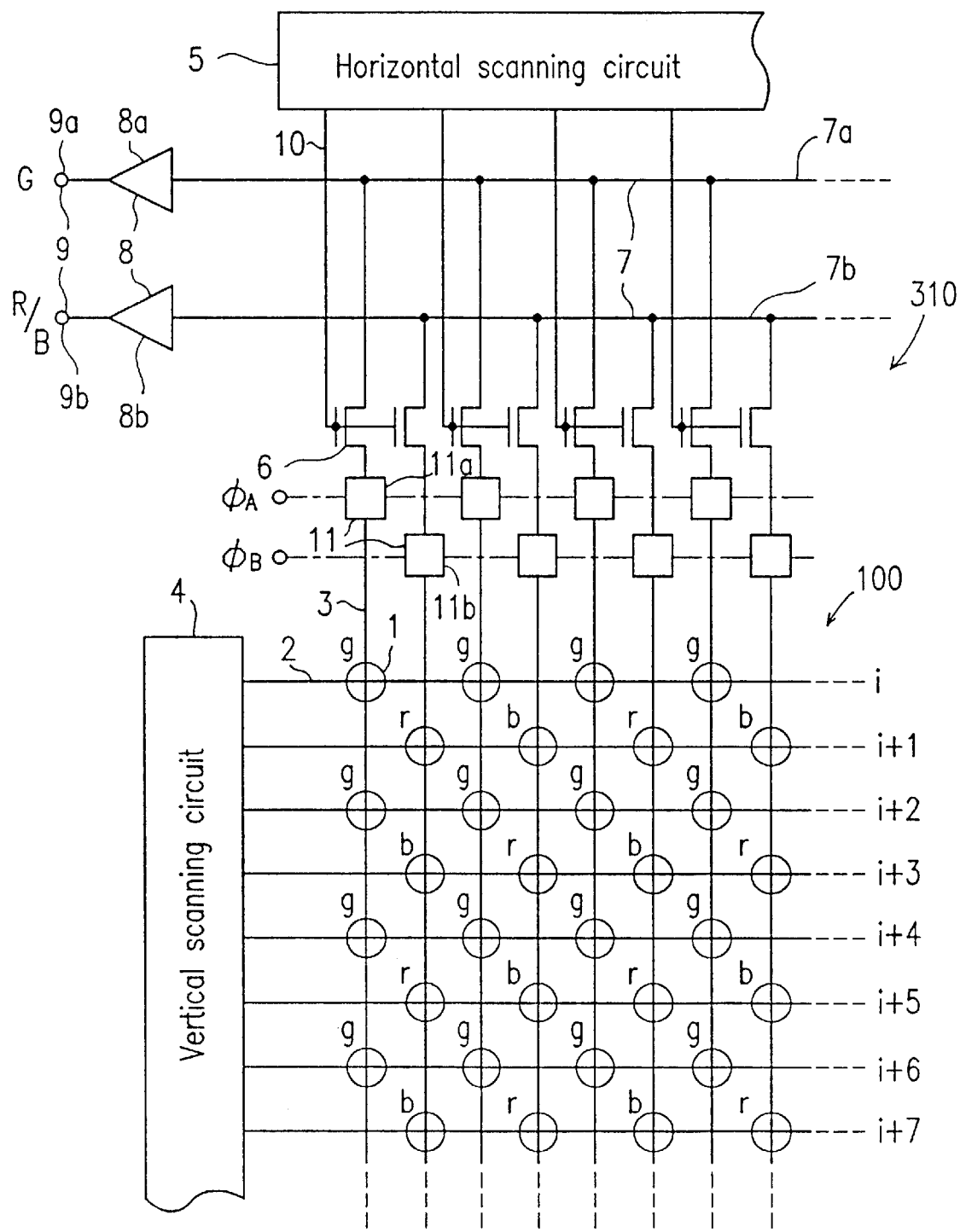
FIG. 9 schematically shows another exemplary circuit configuration of the two-dimensional solid-state imaging apparatus according to the present invention.

FIG. 9 shows another X-Y scan reading type imaging apparatus 310 using the color filter arrangement 100 shown in FIG. 1A. In this figure, the components identical with those in the imaging apparatus 300 shown in FIG. 7 are denoted by reference numerals identical therewith. As shown in FIG. 9, the imaging apparatus 310 includes a plurality of pixels 1, vertical drive lines 2, video signal lines 3, a vertical scanning circuit 4, a horizontal scanning circuit 5, selection switches 6, a pair of horizontal signal lines 7 (i.e., a horizontal signal line 7a for a G signal and a horizontal signal line 7b for an R/B signal), a pair of amplifier circuits 8 (i.e., an amplifier circuit 8a for the horizontal signal line 7a and an amplifier circuit 8b for the horizontal signal line 7b), output lines 9 (i.e., an output line 9a for the G signal and an output line 9b for the R/B signal), drive signal lines 10, and memory devices 11. Each memory device 11 is provided on each video signal line 3 so that a video signal on the video signal line 3 is written in the memory device 11 in accordance with sampling pulse signals $\phi_A$ (for a G signal) and $\phi_B$ (for an R/B signal).

Each pixel 1 is denoted by g, r, and b corresponding to G, R, and B of the color filter arrangement 100. The vertical drive lines 2 are provided one for each pixel group (represented by i to i+7). The vertical scanning circuit 4 applies a drive signal to the vertical drive lines 2, and the corresponding pixel groups are sequentially driven through the vertical drive lines 2. A video signal on each pixel connected to the vertical drive line 2 to which a drive signal is applied is read onto the corresponding video signal line 3. A video signal on the video signal line 3 is written in the memory device 11 in accordance with the sampling pulse signals $\phi_A$ and $\phi_B$.

Each memory device 11 is connected to the corresponding horizontal signal line 7 through the selection switch 6. The horizontal scanning circuit 5 applies a horizontal drive signal to the signal drive lines 10. Each signal drive line 10 is connected to two selection switches 6. The selection switches 6 are driven two at a time, whereby video signals on a pair of memory devices 11 are sequentially read onto the corresponding horizontal signal lines 7a and 7b. The video signals on the horizontal signal lines 7a and 7b are amplified by the corresponding amplifier circuits 8a and 8b, and output as a G signal and an R/B signal from the corresponding output lines 9a and 9b, respectively.

Figure 10A:
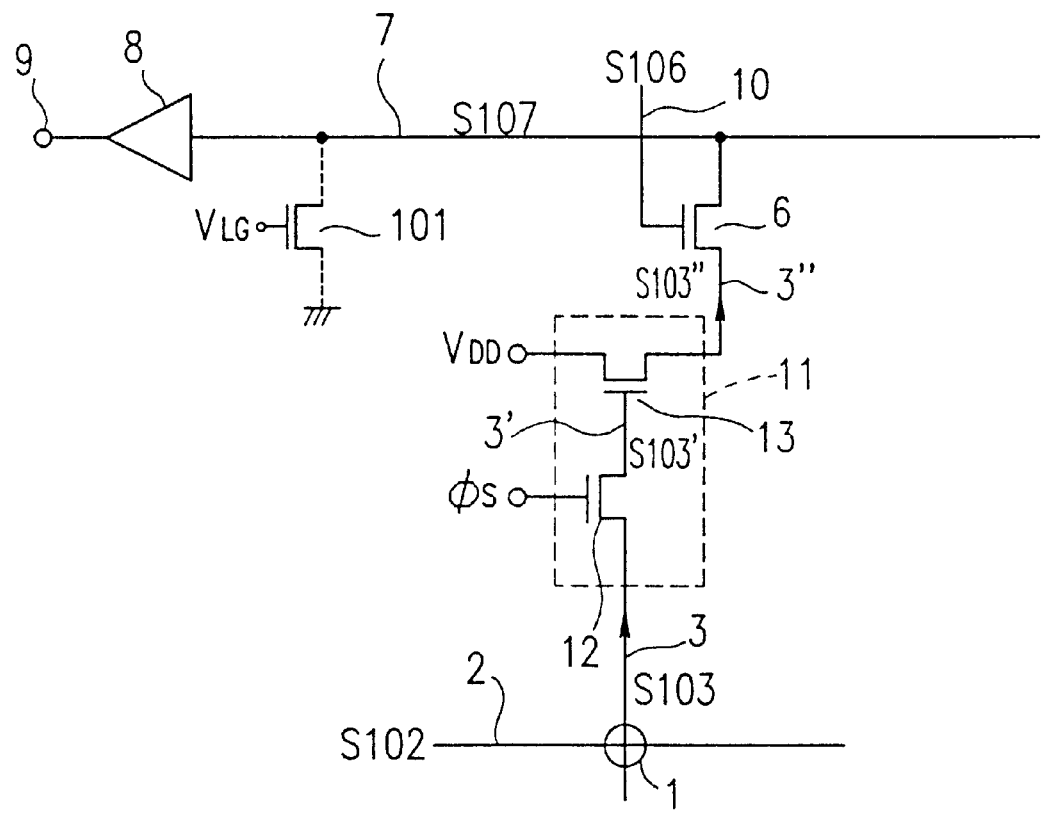
FIG. 10A shows an exemplary configuration of a memory device.

FIG. 10A shows a path in which data read from the pixel 1 shown in FIG. 9 is read to the output line 9 through the video signal line 3, the memory device 11, the selection switch 6, the horizontal signal line 7, and the amplifier circuit 8. The horizontal signal line 7 is connected to a load MOS transistor 101 for reading. As shown in FIG. 10A, the memory device 11 can be composed of, for example, a combination of a sampling device (MOS transistor 12) and a buffer amplifier (MOS transistor 13). In the memory device 11, a sampling signal (sampling clock) $\phi_S$ is applied to a gate of the MOS transistor 12, and a DC voltage $V_{DD}$ is supplied to a drain of the MOS transistor 13 by a power source. Here, the sampling signal $\phi_S$ represents either the sampling signal $\phi_A$ or the sampling signal $\phi_B$.

The data of the pixel 1 is read onto the horizontal signal line 7 through the memory device 11 and the selection switch 6 as follows.

Figure 10B:
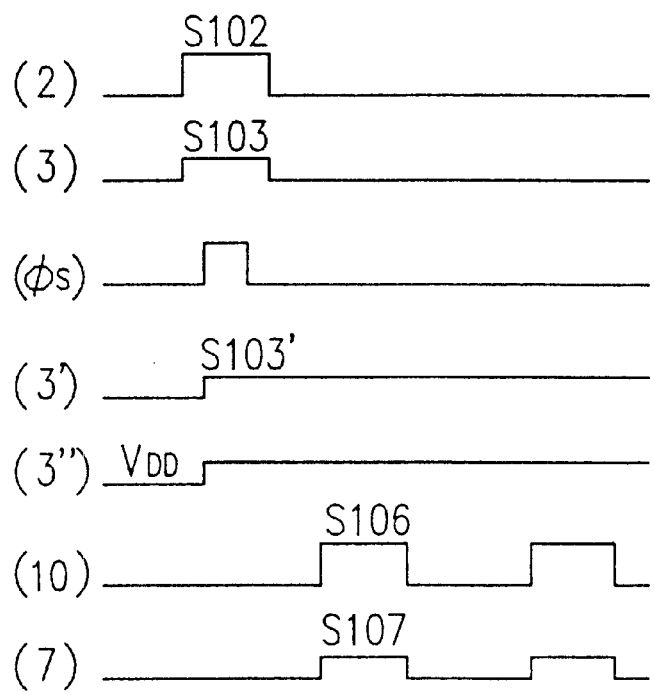
FIG. 10B is a timing diagram showing a read operation from the memory device.

As shown in FIGS. 10A and 10B, when a drive signal S102 is applied to the vertical drive line 2, a video signal (data) S103 is read onto the video signal line 3 from the pixel 1. The video signal 103 on the video signal line 3 is sampled by applying the sampling signal $\phi_S$ to the gate of the MOS transistor 12 and applied to the gate of the MOS transistor 13. Since the gate of the MOS transistor 13 is purely a capacitive load, a voltage signal on a signal line 3' is held as it is (signal S103') even after the MOS transistor 12 becomes non-conductive. The signal S103' is held as it is until the MOS transistor 12 becomes conductive (i.e., the next pulse of the sampling signal $\phi_S$ is applied). Thus, the conductive state of the MOS transistor 13 is kept as it is, and the output from the memory device 11 (the signal S103" on the signal line 3") is kept as the DC voltage $V_{DD}$ from the drain of the MOS transistor 13, as shown in FIG. 10A. In this way, the data read from the pixel 1 is stored in the memory device 11.

The signal S103" on the signal line 3l" (i.e., the signal S103' stored in the gate of the MOS transistor 13) is read onto the horizontal signal line 7 when the selection switch 6 becomes conductive by a horizontal drive signal S106. The load MOS transistor 101 (not shown in FIG. 9) temporarily becomes conductive before the selection switch 6 becomes conductive, thereby grounding the electric potential of the horizontal signal line 7. The selection switch 6 is allowed to be conductive after the load MOS transistor 101 becomes non-conductive, whereby the signal S103" in accordance with the data stored in the gate of the MOS transistor 13 is always read as the video signal S107 onto the horizontal signal line 7. Thus, the MOS transistor 12 and the load MOS transistor 101 form a source-follower circuit.

As described above, the data stored in the gate of the MOS transistor 13 can be read a number of times by allowing the selection switch 6 to be conductive by the horizontal drive signal S106 of the signal drive line 10.

Next, the operation of the imaging apparatus 310 will be described in more detail.

Figure 11:
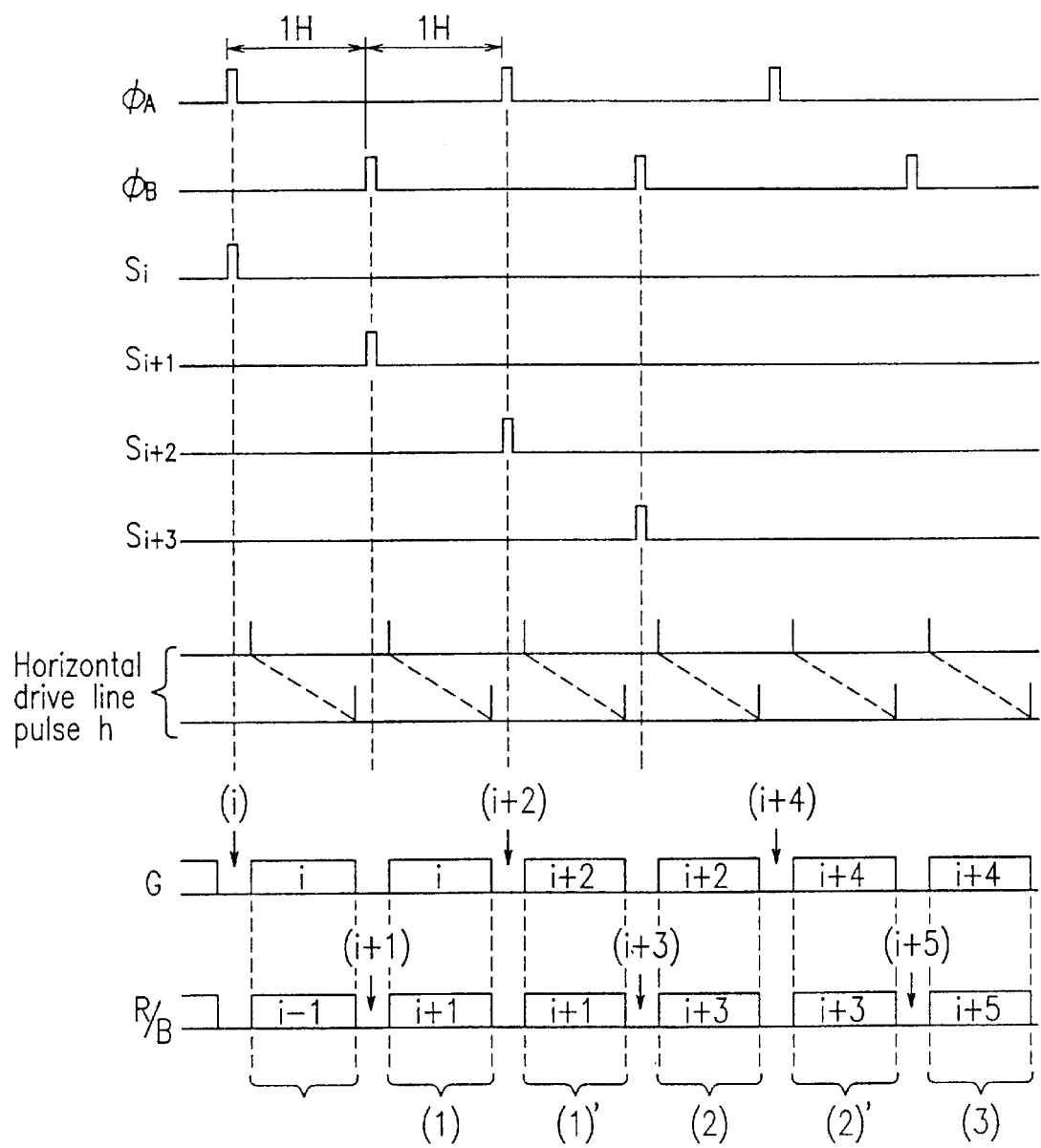
FIG. 11 is a timing diagram illustrating a read operation of the two-dimensional solid-state imaging apparatus shown in FIG. 9.

FIG. 11 shows a drive timing diagram of the imaging apparatus 310. As shown in FIGS. 9 through 11, the sampling pulse signals $\phi_A$ and $\phi_B$ respectively have a sampling pulse at a 2H period (where H represents one horizontal scanning period), and each sampling pulse is placed in such a manner that either sampling pulse is output at intervals of every other 1H. Thus, in the memory device 11, the video signal of the pixel 1 connected to the corresponding video signal line is written at intervals of 2H (that is, a new video signal is rewritten). The video signal written in the memory device 11 is held during a 2H period until the next video signal is written.

Drive pulse signals $S_i, S_{i+1}, S_{i+2}, \ldots$ are sequentially output from the vertical scanning circuit 4 to the corresponding vertical drive lines 2 at intervals of 1H. A video signal is read from the pixel 1 connected to each vertical drive line. The read video signal is written in the corresponding memory device 11 at a predetermined timing in accordance with the corresponding sampling pulse signals $\phi_A$ and $\phi_B$.

The horizontal scanning circuit 5 sequentially scans all the drive signal lines 10 with a horizontal drive signal h during a 1H period. When one drive signal line 10 is scanned, the corresponding pair of selection switches 6 are simultaneously selected, and the video signal held by the corresponding two memory devices 11 are simultaneously read onto the corresponding horizontal signal lines 7a and 7b.

More specifically, the read operation is conducted, for example, as follows.

First, a video signal (i) is written in a memory device 11a from the pixel 1 on a vertical scanning line 2(i) in accordance with a drive pulse signal $S_i$ and a sampling signal $\phi_A$. The drive signal lines 10 are sequentially scanned with a horizontal drive signal h during a 1H period, whereby the video signal (i) is sequentially read onto the horizontal signal line 7a from each memory device 11a and output as a G signal. Simultaneously, a video signal (i−1) is sequentially read onto the horizontal signal line 7b from each memory device 11b and output as an R/B signal. Here, the video signal (i−1) is a video signal which has been written by a previous drive pulse signal $S_{i-1}$ and a sampling pulse signal $\phi_A$.

Next, a video signal (i+1) is written in the memory device 11b from the pixel 1 on the vertical scanning line 2(i+1) in accordance with a drive pulse signal $S_{i+1}$ and a sampling pulse signal $\phi_B$. The drive signal lines 10 are sequentially scanned with a horizontal drive signal h during a 1H period, whereby the previous video signal (i) is read onto the horizontal signal line 7a from each memory device 11a and output as a G signal. Simultaneously, the video signal (i+1) which is read this time is sequentially read onto the horizontal signal line 7b from each memory device 11b and output as an R/B signal.

Thus, as for the G signal, an identical video signal is repeatedly output during a 2H period. More specifically, an identical video signal is output twice ((i), (i), (i+2), (i+2) . . . ), and data is changed at intervals of 2H. Similarly, as for the R/B signal, an identical video signal is repeatedly output during a 2H period. More specifically, an identical video signal is output twice, and data is changed at intervals of 2H. The G signal and the R/B signal are repeated with a shift of period 1H, and adjacent two lines of signal are output from two output terminals 9a and 9b with a shift corresponding to one line at each 1H interval, as shown in read groups (1), (1)', (2), (2)', (3), . . . in FIG. 11.

Figure 12:
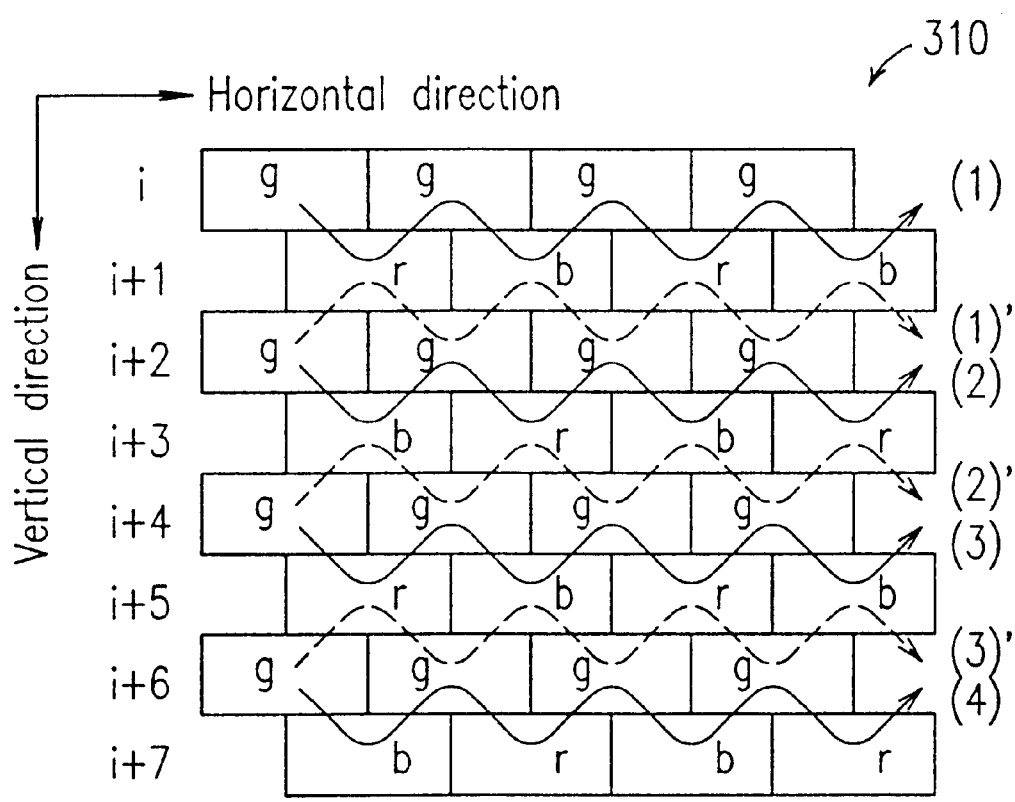
FIG. 12 schematically illustrates signal reading in the two-dimensional solid-state imaging apparatus shown in FIG. 9.

FIG. 12 schematically shows a state where a video signal is read from the imaging apparatus 310. As shown in FIG. 12, video signals are read in a zigzag manner from two rows of pixel groups at a time, which is the same as reading from the imaging apparatus 300 shown in FIG. 8 with an exception. Specifically, unlike the imaging apparatus 300, read signal groups (1)', (2)', (3)' . . . are obtained between the respective read groups (1), (2), (3), (4), . . . in the imaging apparatus 310. Therefore, the substantial number of vertical scanning lines is doubled. More specifically, the vertical resolution can be doubled. This is because each identical pixel signal is read twice, which enhances the advantage of the color filter arrangement 100 shown in FIG. 1A. The color filter arrangement 100 has been described in the above. However, the above description can be applied to the color filter arrangements 110 and 120 shown in FIGS. 1B and 1C.

EXAMPLE 3

Figure 13:
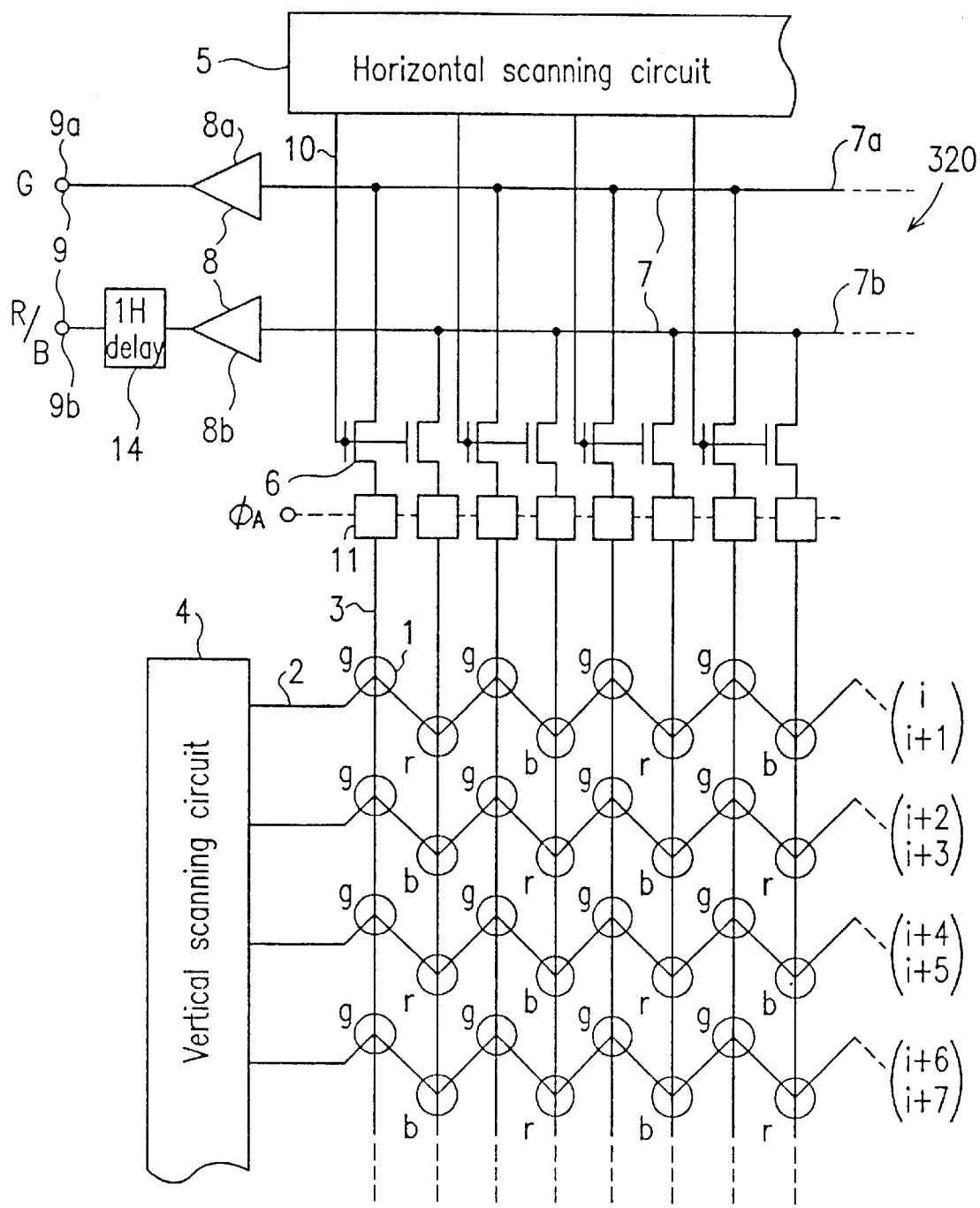
FIG. 13 schematically shows still another exemplary circuit configuration of the two-dimensional solid-state imaging apparatus according to the present invention.

FIG. 13 shows still another X-Y scan reading type imaging apparatus 320 using the color filter arrangement 100 shown in FIG. 1A. In this figure, the components identical with those of the imaging apparatuses 300 and 310 shown in FIGS. 7 and 9 are denoted by reference numerals identical therewith. As shown in FIG. 13, the imaging apparatus 320 includes a plurality of pixels 1, vertical drive lines 2, video signal lines 3, a vertical scanning circuit 4, a horizontal scanning circuit 5, selection switches 6, a pair of horizontal signal lines 7 (i.e., a horizontal signal line 7a for a G signal and a horizontal signal line 7b for an R/B signal), a pair of amplifier circuits 8 (i.e., an amplifier circuit 8a for the horizontal signal line 7a and an amplifier circuit 8b for the horizontal signal line 7b), output lines 9 (i.e., an output line 9a for a G signal and an output line 9b for an R/B signal), drive signal lines 10, memory devices 11, and a 1H delay line 14. The memory device 11 is provided with respect to each video signal line 3 so that a video signal on each video signal line 3 is written in each memory device 11 in accordance with a sampling pulse signal $\phi_A$. The 1H delay line 14 is inserted between the amplifier circuit 8b and the output line 9b.

Each pixel 1 is denoted by g, r, and b corresponding to G, R, and B of the color filter arrangement 100. One vertical drive line 2 is provided with respect to two adjacent pixel groups (e.g., i and i+1). The vertical scanning circuit 4 applies a drive signal to the vertical drive lines 2, thereby sequentially driving the corresponding pixel groups by two through the vertical drive lines 2 in the vertical direction. A video signal of each pixel connected to the vertical drive line 2 with a drive signal applied thereto is read onto the corresponding video signal line 3. The video signal on the video signal line 3 is written in the memory device 11 in accordance with a sampling pulse signal $\phi_A$.

Each memory device 11 is connected to either the corresponding horizontal signal line 7a or 7b through the selection switch 6. The signal drive lines 10 are supplied with a horizontal drive signal from the horizontal scanning circuit 5. Each signal drive line 10 is connected to two selection switches 6. Two selection switches 6 are driven simultaneously, whereby video signals on a pair of memory devices 11 are sequentially read onto the corresponding horizontal signal lines 7a and 7b. The video signal on the horizontal signal line 7a is amplified by the amplifier circuit 8a and output as a G signal from the output lines 9a and 9b. The video signal on the horizontal signal line 7b is amplified by the amplifier circuit 8b and output as an R/B signal from the output line 9b with a delay of one horizontal period by the 1H delay line 14.

Next, the operation of the imaging apparatus 320 will be described in more detail.

Figure 14:
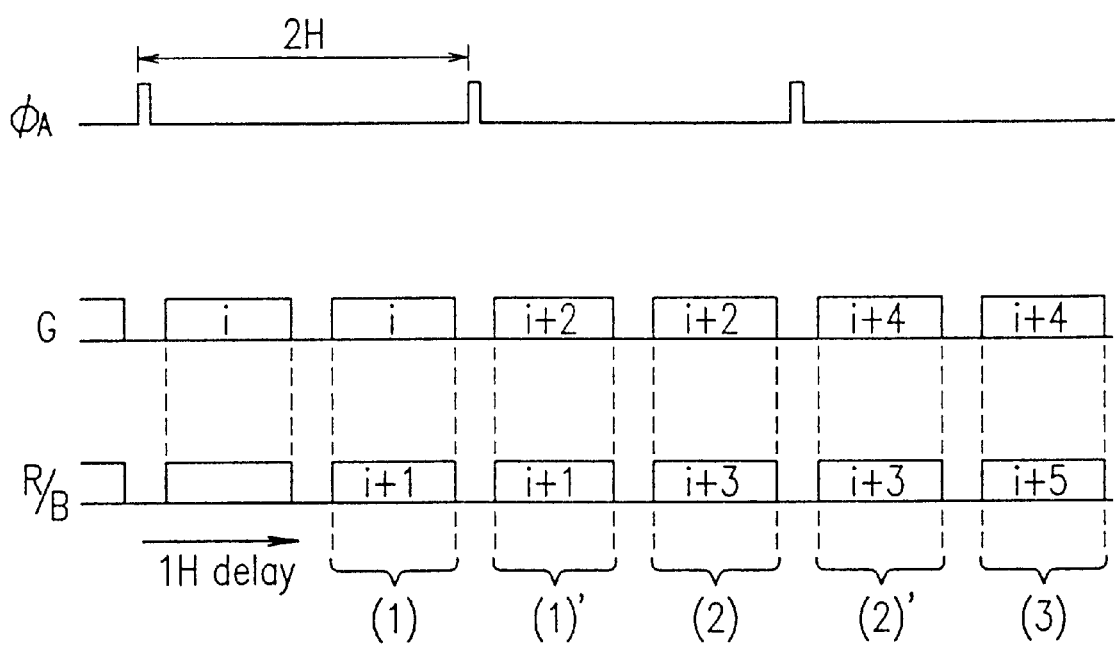
FIG. 14 is a timing diagram illustrating a read operation in the two-dimensional solid-state imaging apparatus shown in FIG. 13.

FIG. 14 shows a drive timing diagram of the imaging apparatus 320 shown in FIG. 13. As shown in FIGS. 13 and 14, the sampling pulse signal $\phi_A$ has a sampling pulse with a 2H period. Thus, the video signal of the pixel 1 connected to the corresponding video signal line 3 is written at intervals of 2H in the memory device 11 (i.e., the video signal is rewritten to a new video signal). The video signal written in the memory device 11 is held therein during a 2H period until the next video signal is written.

The vertical scanning circuit 4 supplies a drive pulse signal to the vertical drive line 2 at intervals of 2H. One vertical drive line 2 allows video signals to be simultaneously read from a pair of pixel groups (i.e., a G pixel group in the odd-number row and an R/B pixel group in the even-number row) onto the corresponding video signal line 3. The read video signal is written in the corresponding memory device 11 at intervals of 2H in accordance with a sampling pulse signal $\phi_A$.

The horizontal scanning circuit 5 sequentially scans all the drive signal lines 10 with a horizontal drive signal h during a 1H period. When one drive signal line 10 is scanned, the corresponding pair of selection switches 6 are simultaneously selected, and the video signals held by the corresponding two memory devices 11 are simultaneously read onto the corresponding horizontal signal lines 7a and 7b. At this time, a video signal (i) is sequentially read onto the horizontal signal line 7a from each memory device 11 corresponding to the G pixel group (G signal). Simultaneously, a video signal (i+1) is sequentially read onto the horizontal signal line 7b from each memory device 11 corresponding to the R/B pixel group.

As described above, an identical video signal is repeatedly read from each pixel 1 during a 2H period. More specifically, each identical video signal is output twice onto the horizontal signal line 7a ((i), (i), (i+2), (i+2) . . . ), and data is changed at intervals of 2H. The signal on the horizontal signal line 7a is amplified by the amplifier circuit 8a and output from the output line 9a as a G signal.

Similarly, each identical video signal is repeatedly output twice onto the horizontal signal line 7b during a 2H period ((i+1), (i+1), (i+3), (i+3) . . . ), and data is changed at intervals of 2H. The R/B signal is amplified by the amplifier circuit 8b, and output with delay of 1H by the 1H delay line 14.

Thus, two adjacent lines of signal are output from two output terminals 9a and 9b at intervals of 1H with a shift corresponding to one line, as shown in read groups (1), (1)', (2), (2)', (3), . . . in FIG. 14. Thus, the imaging apparatus 320 also allows output signals G, R, and B similar to those obtained in the imaging apparatus 310 to be obtained.

Like the imaging apparatus 310, schematic read operation of a video signal from the imaging apparatus 320 is as shown in FIG. 12. The imaging apparatus 320 also allows video signals to be read from two rows of pixel groups in a zigzag manner at one time. In the same way as in the imaging apparatus 310, read signal groups (1)', (2)', (3)' . . . are obtained between the respective read groups (1), (2), (3), (4), . . . in the imaging apparatus 320. Therefore, the substantial number of vertical scanning lines becomes doubled. More specifically, the vertical resolution can be doubled. This is because the identical pixel signal is read twice, which enhances the advantage of the color filter arrangement 100 shown in FIG. 1A.

The color filter arrangement 100 has been described in the above. However, the above description can be applied to the color filter arrangements 110 and 120 shown in FIGS. 1B and 1C. The memory device 11 can be constructed in the same way as described in Example 2 (FIG. 10A).

EXAMPLE 4

Figure 15:
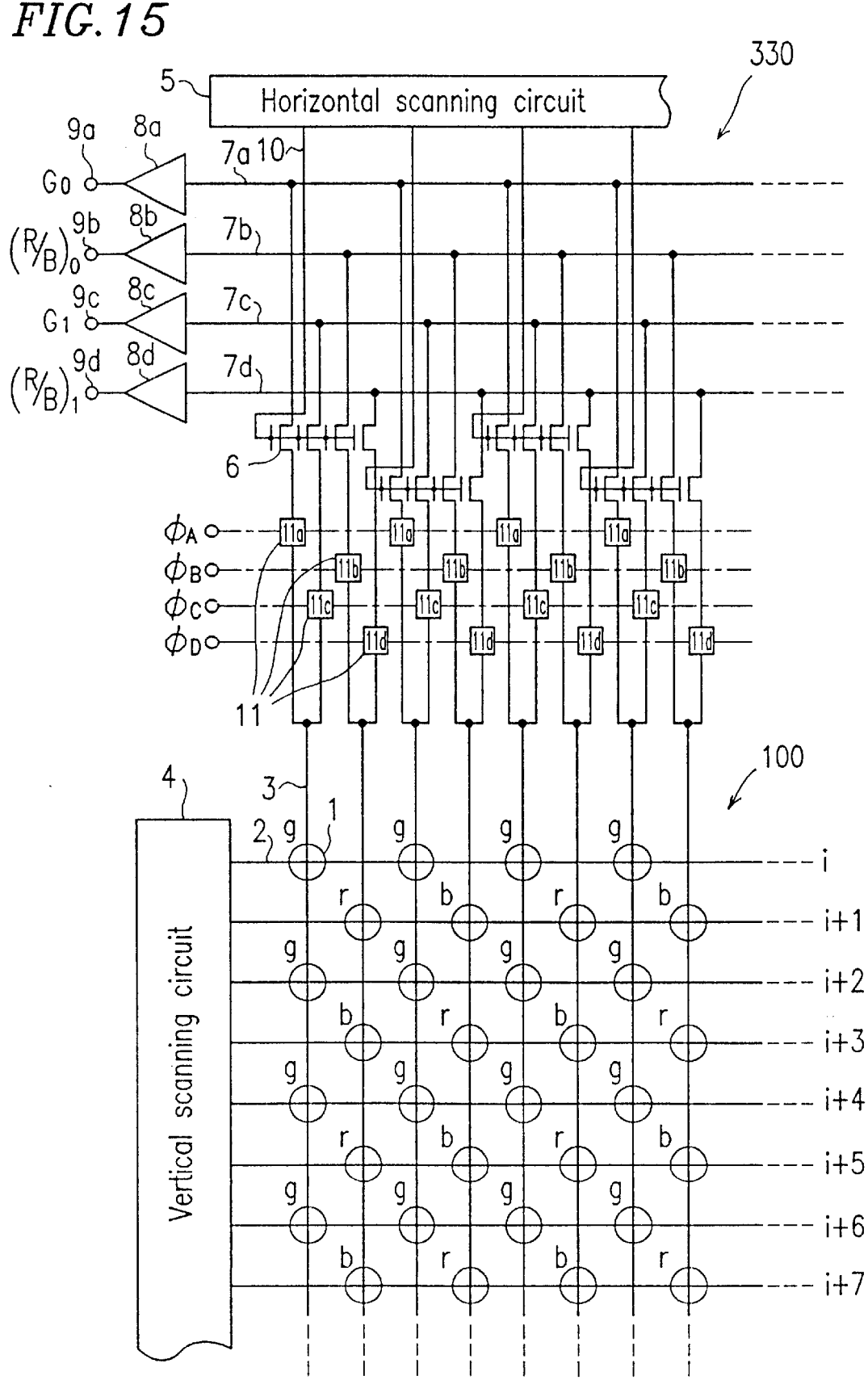
FIG. 15 schematically shows still another exemplary circuit configuration of the two-dimensional solid-state imaging apparatus according to the present invention.

FIG. 15 shows another X-Y scan reading type imaging apparatus 330 using the color filter arrangement 100 shown in FIG. 1A. In this figure, the components identical with those in the imaging apparatus 310 shown in FIG. 9 are denoted by reference numerals identical therewith. As shown in FIG. 15, the imaging apparatus 330 includes a plurality of pixels 1, vertical drive lines 2, video signal lines 3, a vertical scanning circuit 4, a horizontal scanning circuit 5, selection switches 6, a plurality of horizontal signal lines 7 (FIG. 15 shows four horizontal signal lines 7a through 7d), and amplifier circuits 8a through 8d provided on the respective horizontal signal lines 7a through 7d, output lines 9a through 9d for outputting a signal from each of the amplifier circuits 8a through 8d, drive signal lines 10, and memory devices 11 (11a through 11d). Two memory devices 11 are provided in parallel with respect to each video signal line 3. More specifically, as shown in FIG. 15, the memory devices 11a and 11c are provided with respect to the video signal line 3 onto which a G signal is read, and memory devices 11b and 11d are provided with respect to the video signal line 3 onto which R and B signals are read.

Each pixel 1 is denoted by g, r, and b corresponding to G, R, and B of the color filter arrangement 100. One vertical drive line 2 is provided with respect to each pixel group (in the figure, denoted by i to i+7). The vertical scanning circuit 4 applies a drive signal to the vertical drive lines 2, thereby sequentially driving the corresponding pixel groups through the vertical drive lines 2 in the vertical direction. A video signal of each pixel connected to the vertical drive line 2 with a drive signal applied thereto is read onto the corresponding video signal line 3. Among the video signals read onto the video signal line 3, a G signal is written in the corresponding memory devices 11a and 11c in accordance with sampling pulse signals $\phi_A$ and $\phi_c$, and R and B signals are written in the corresponding memory devices 11b and 11d in accordance with sampling pulse signals $\phi_B$ and $\phi_D$.

The respective memory devices 11a through 11d are connected to the corresponding horizontal signal lines 7a through 7d via the selection switches 6. The signal drive lines 10 are supplied with a horizontal drive signal from the horizontal scanning circuit 5. The respective signal drive lines 10 are connected to four selection switches 6. Four selection switches 6 are driven simultaneously, whereby the video signals stored in four memory devices 11a through 11d are sequentially read onto the corresponding horizontal signal lines 7a through 7d. The video signals on the horizontal signal lines 7a through 7d are amplified by the corresponding amplifier circuits 8a through 8d and output from the corresponding output lines 9a through 9d as a G signal ($G_0$ and $G_1$) and an R/B signal (($R/B)_1$ and ($R/B)_2$).

Figure 16:
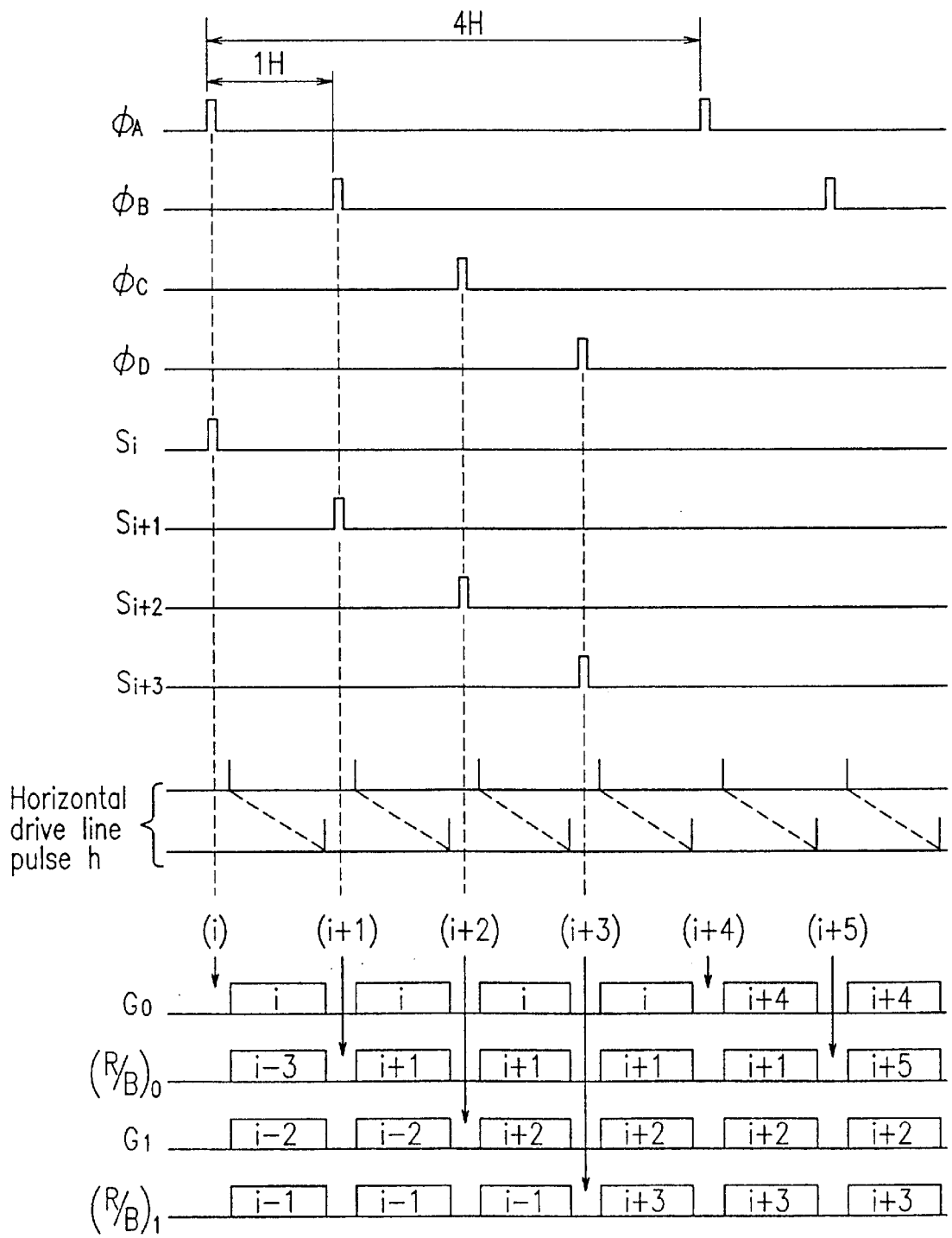
FIG. 16 is a timing diagram illustrating a read operation of the two-dimensional solid-state imaging apparatus shown in FIG. 15.
Figure 17A:
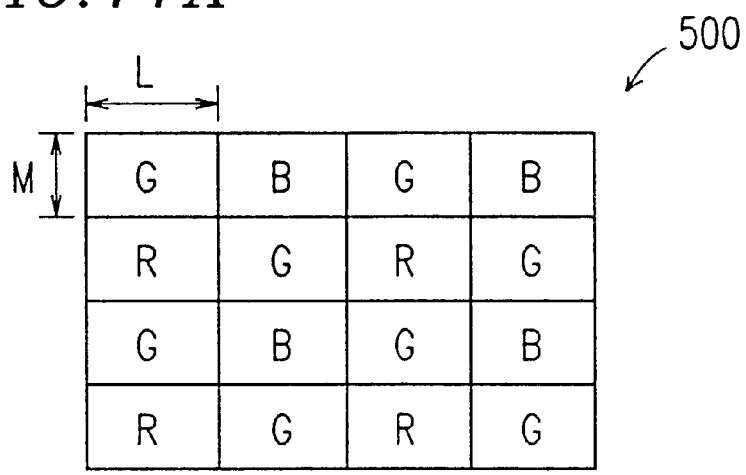
FIG. 17A shows an exemplary color filter arrangement used in a conventional two-dimensional solid-state imaging apparatus.
Figure 17B:
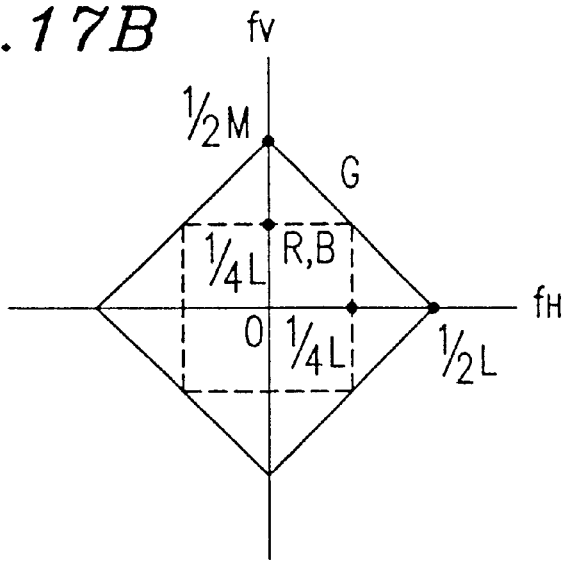
FIG. 17B shows spatial resolution characteristics in each direction of the respective G, R, and B pixels in the color filter arrangement shown in FIG. 17A.
Figure 18A:
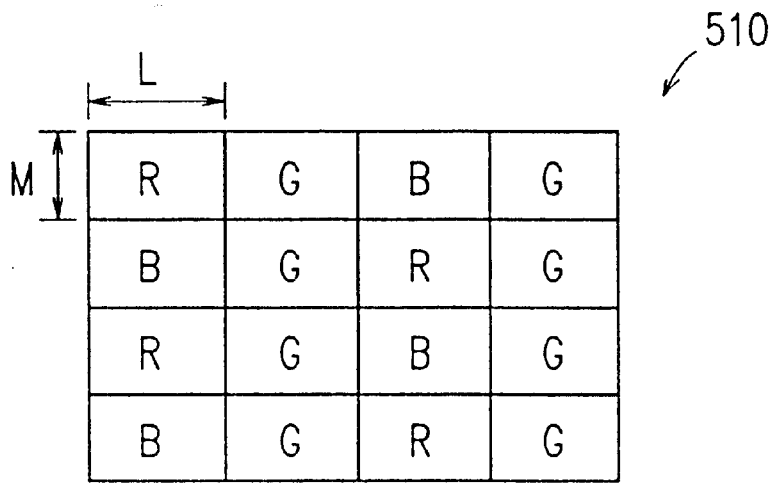
FIG. 18A shows another exemplary color filter arrangement used in the conventional two-dimensional solid-state imaging apparatus.
Figure 18B:
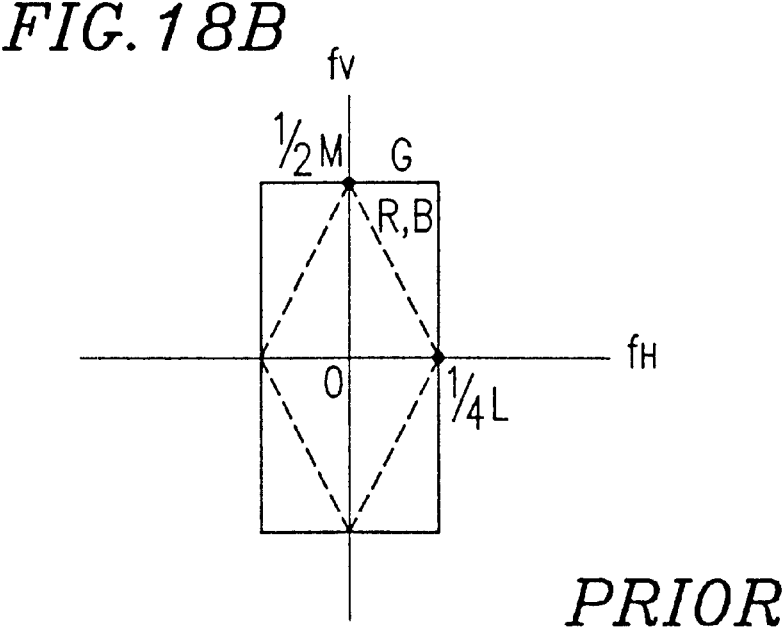
FIG. 18B shows spatial resolution characteristics in each direction of the respective G, R, and B pixels in the color filter arrangement shown in FIG. 18A.
Figure 19A:
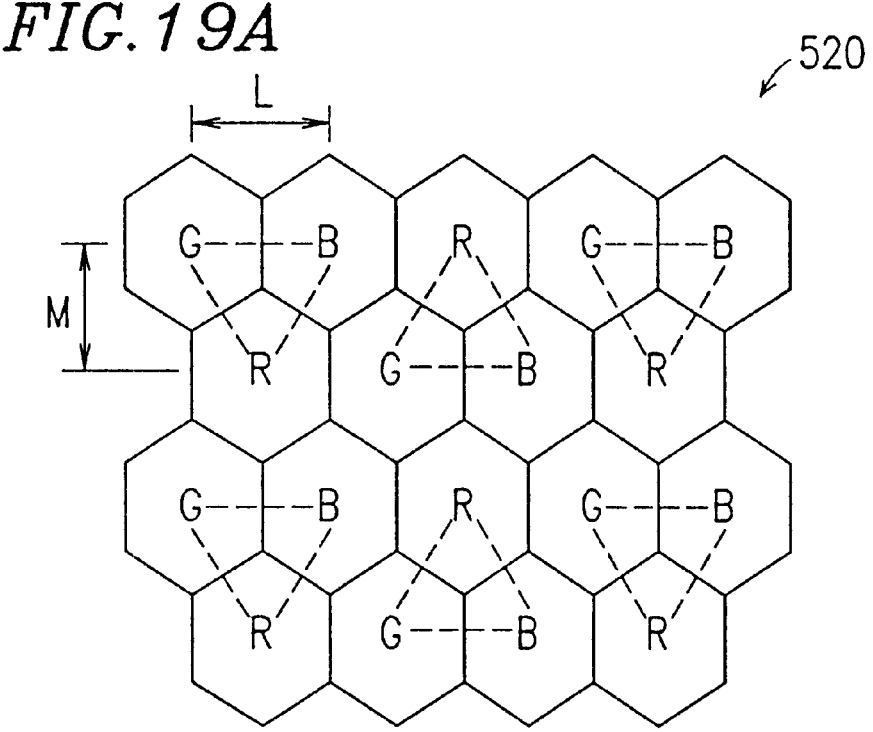
FIG. 19A shows still another exemplary color filter arrangement used in the conventional two-dimensional solid-state imaging apparatus.
Figure 19B:
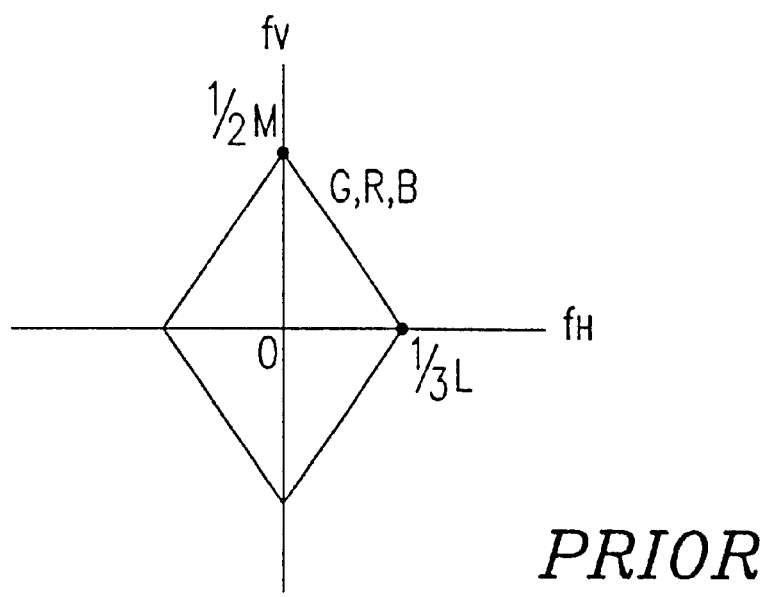
FIG. 19B shows spatial resolution characteristics in each direction of the respective G, R, and B pixels in the color filter arrangement shown in FIG. 19A.

FIG. 16 is a timing diagram showing a read operation of the X-Y scan reading type imaging apparatus 330. As shown in FIGS. 15 and 16, the sampling pulse signals $\phi_A$ through $\phi_D$ respectively have a sampling pulse with a 4H period (where H represents one horizontal scanning period) and any of the sampling pulses is output at intervals of 1H. Thus, the video signal of the pixel 1 connected to the corresponding video signal line is written in the memory device 11 at intervals of 4H and rewritten to a new video signal. More specifically, the video signal written in each memory device 11 is held therein during a 4H period until a next video signal is written.

Drive pulse signals $S_i$, $S_{i+1}$, $S_{i+2}$, $S_{i+3}$, . . . are sequentially output from the vertical scanning circuit 4 onto the vertical drive lines 2 (i, i+1, i+2, i+3, . . . ) at intervals of 1H, and a video signal is read from each pixel 1 connected to each vertical drive line 2 onto the video signal lines 3. The read video signals are written in the corresponding memory devices 11a through 11d at a predetermined timing in accordance with the corresponding sampling pulse signals $\phi_A$ through $\phi_D$.

The horizontal scanning circuit 5 sequentially scans all the drive signal lines 10 with a horizontal drive signal h during a 1H period. When one drive signal line 10 is scanned, the corresponding four selection switches 6 are simultaneously selected, and the video signals held by the corresponding four memory devices 11a through 11d are simultaneously read onto the corresponding horizontal signal lines 7a through 7d.

More specifically, a read operation is conducted, for example, as follows.

As shown in FIGS. 15 and 16, a video signal (i) is written onto a memory device 11a from the pixel 1 on a vertical scanning line 2(i) by a drive pulse signal $S_i$ and a sampling pulse signal $\phi_A$. At this time, a video signal (i−3) written by a driving pulse signal $S_{i-3}$ (3H earlier) and a sampling pulse signal $\phi_A$ is held in the memory device 11b. Similarly, a video signal (i−2) written 2H earlier is held in the memory device 11c, and a video signal (i−1) written 1H earlier is held in the memory device 11d.

The drive signal lines 10 are sequentially scanned with a horizontal drive signal h during a 1H period, whereby video data is simultaneously read by the selection switch 6 connected to each drive signal line 10 from the corresponding memory devices 11a through 11d. More specifically, a video signal (i) is read onto the horizontal signal line 7a from the memory device 11a and output as a $G_0$ signal; a video signal (i−3) is read onto the horizontal signal line 7b from the memory device 11b and output as a $(R/B)_0$ signal; a video signal (i−2) is read onto the horizontal signal line 7c from the memory device 11c and output as a $G_1$ signal; and a video signal (i−1) is read onto the horizontal signal line 7d from the memory device 11d and output as a $(R/B)_1$ signal.

Then, a video signal (i+1) is written in the memory device 11b from the pixel 1 on the vertical scanning line 2(i+1) by a drive pulse signal $S_{i+1}$ and a sampling pulse signal $\phi_B$. The drive signal lines 10 are sequentially scanned with a horizontal drive signal h during a 1H period, whereby the previous signal (i) is read again onto the horizontal signal line 7a from the memory device 11a and output as a Go signal, and a video signal (i+1) written this time is sequentially read onto the horizontal signal line 7b from the memory device 11b and output as a $(R/B)_0$ signal. Simultaneously, the previous video signal (i−2) is read onto the horizontal signal line 7c from the memory device 11c and output as a $G_1$ signal, and a video signal (i−1) is read onto the horizontal signal line 7d from the memory device 11d and output as an $(R/B)_1$ signal.

Thus, regarding the Go signal, an identical video signal is repeatedly output during a 4H period. More specifically, each identical video signal is output four times ((i), (i), (i), (i), (i+4), (i+4), (i+4), (i+4) . . . ), and data is changed at intervals of 4H.

Similarly, regarding the $G_1$ signal, the $(R/B)_0$ signal, and the $(R/B)_1$ signal, an identical video signal is repeatedly output during a 4H period. The repetition periods of the $G_0$ signal, the $G_1$ signal, the $(R/B)_0$ signal, and the $(R/B)_1$ signal are respectively 4H and shifted by 1H. Thus, as shown in FIG. 16, four adjacent lines of signal are output from four output terminals 9a through 9d with a shift corresponding to one line at intervals of 1H. This facilitates signal processing of four pixels arranged in the vertical direction so as to be useful for chrominance signal processing and image compression processing.

The memory device 11 can be constructed in the same way as described in Example 2 (FIG. 10A).

As described above, according to the present invention, G pixels which largely occupy a luminance signal are arranged in a lattice with a predetermined interval in the first and second directions in a progressive scan reading type, color solid-state imaging apparatus. Therefore, assuming that the first direction is a horizontal direction and the second direction is a vertical direction, high resolution can be obtained in the horizontal, vertical, and oblique directions.

Furthermore, R pixels and B pixels provide spacial resolution which is ½ of that of the G pixels, whereby well-balanced color resolution can be obtained.

Furthermore, assuming that the pixel pitch in the horizontal direction is L, the pixel pitch in the vertical direction is M, and L=M, the G pixels are placed in a square lattice, whereby luminance signals are arranged in square pixels. Therefore, an arrangement suitable for taking in a color image into a personal computer can be obtained. The effect of the present invention can be realized more advantageously by applying the present invention to an X-Y scan reading type solid-state imaging apparatus which uses the first and second directions as scanning directions.

At least two memory devices are provided with respect to one video signal line and a plurality of horizontal signal lines are correspondingly provided, whereby signal processing of a plurality of pixels continuously disposed in the vertical direction is facilitated, and a two-dimensional solid-state imaging apparatus useful for chrominance signal processing and image compression processing can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color solid-state imaging apparatus, comprising a plurality of pixels conducting photoelectric conversion arranged in a matrix and color filters disposed so as to correspond to the plurality of pixels, wherein the color filters include first filters of a first kind, second filters of a second kind, and third filters of a third kind, each kind of filter having spectral characteristics different from the others, the plurality of pixels are arranged at a pitch L in a vertical direction to form columns, and each of the columns is arranged at a pitch of L/2 in a horizontal direction orthogonal to the vertical direction, the pixels disposed in even-number columns are shifted in the vertical direction by L/2 from the corresponding pixels disposed in odd-number columns, the first filters are disposed so as to correspond to all the pixels arranged in the odd-number columns, the second filters are disposed so as to correspond to half of the pixels arranged in the even-number columns at a predetermined period, the third filters are disposed so as to correspond to the remaining pixels in the even-number columns, horizontally adjacent pixels from each even-number column define horizontal rows and horizontally adjacent pixels from each odd-number column define subsequent horizontal rows, a video signal on each pixel is read for scanning the plurality of pixels in the horizontal direction in a zigzag manner from one horizontal row and a subsequent horizontal row, and each pixel is arranged in a shape of a regular square when viewing the arrangement of filters in a diagonal line.

2. A color solid-state imaging apparatus according to claim 1, wherein the shape of each of the plurality of pixels is substantially rectangular.

3. A color solid-state imaging apparatus according to claim 1, wherein the the shape of each of the plurality of pixels is substantially a diamond.

4. A color solid-state imaging apparatus according to claim 1, wherein the second filters are disposed so as to correspond to every other pixel in each of the even-number columns, and in an even-number column next to one even-number column with one odd-number column interposed therebetween, the second filters are disposed with respect to the remaining pixels not corresponding to the pixels at which the second filters are disposed in the one even-number column.

5. A color solid-state imaging apparatus according to claim 1, wherein the second filters are disposed so as to correspond to every other pixel in each of the even-number columns, and in an even-number column next to one even-number column with one odd-number column interposed therebetween, the second filters are disposed with respect to the remaining pixels corresponding to the pixels at which the second filters are disposed in the one even-number column.

6. A color solid-state imaging apparatus according to claim 1, wherein the second filters and the third filters are alternately disposed on a column basis in every other even-number column.

7. A color solid-state imaging apparatus according to claim 1, wherein the second filters and the third filters are alternately disposed on a column basis in every other even-number column.

8. A color solid-state imaging apparatus according to claim 1, wherein the plurality of pixels disposed in a matrix are scanned in the vertical direction and the horizontal direction, whereby video signals are read from the plurality of pixels.

9. A color solid-state imaging apparatus according to claim 8, further comprising a first scanning circuit for scanning the plurality of pixels in the horizontal direction and a second circuit for scanning the plurality of pixels in the vertical direction, wherein the first and second scanning circuits sequentially scan all the plurality of pixels disposed in the matrix in the horizontal direction and the vertical direction.

10. A color solid-state imaging apparatus according to claim 9, comprising a plurality of vertical signal lines for transmitting a video signal read from each of the pixels by scanning of the second scanning circuit and a plurality of memory devices provided with respect to each of the vertical signal lines, for holding the video signals on the vertical signal lines, wherein the first scanning circuit scans the plurality of memory devices to read an identical video signal of one pixel held by the memory device at least twice, thereby substantially increasing resolution in the vertical direction.

11. A color solid-state imaging apparatus according to claim 10, wherein the plurality of memory devices include a first memory device group provided with respect to the pixels in the odd-number columns and a second memory device group provided with respect to the pixels in the even-number columns, a plurality of horizontal signal lines for transmitting video signals read from the first and second memory device groups are provided, the first scanning circuit reads an identical video signal of one pixel held by each of the memory devices of the first and second memory device groups at least twice at a predetermined period, and a timing at which a video signal output from one of the plurality of horizontal signal lines changes from a video signal in one horizontal row to a video signal in a subsequent horizontal row is different from a timing at which a video signal output from another horizontal signal line different from the one of the plurality of horizontal signal lines changes from a video signal in one horizontal row to a video signal in a subsequent horizontal row.

* * * * *